(12) United States Patent
Varnum et al.

(10) Patent No.: US 11,451,700 B2
(45) Date of Patent: Sep. 20, 2022

(54) GAME CAMERA HAVING CAMERA CONTROL MODULE

(71) Applicant: Battenfeld Technologies, Inc., Columbia, MO (US)

(72) Inventors: Ryan Varnum, Columbia, MO (US); Timothy S. Kinney, Warrenton, MO (US); Kyle Martin, Columbia, MO (US); Curtis Smith, Columbia, MO (US); Matthew Kinamore, Columbia, MO (US); James Tayon, Moberly, MO (US)

(73) Assignee: AOB Products Company, Columbia, MO (US)

( * ) Notice: Subject to any disclaimer, the term of this patent is extended or adjusted under 35 U.S.C. 154(b) by 0 days.

(21) Appl. No.: 16/811,601

(22) Filed: Mar. 6, 2020

(65) Prior Publication Data

US 2020/0288055 A1 Sep. 10, 2020

Related U.S. Application Data

(60) Provisional application No. 62/814,555, filed on Mar. 6, 2019.

(51) Int. Cl.
*H04N 5/232* (2006.01)

(52) U.S. Cl.
CPC ..... *H04N 5/23206* (2013.01); *H04N 5/23216* (2013.01); *H04N 5/23241* (2013.01)

(58) Field of Classification Search
CPC .......... H04N 5/23206; H04N 5/23241; H04N 5/23216
See application file for complete search history.

(56) References Cited

U.S. PATENT DOCUMENTS

| | | |
|---|---|---|
| 5,189,520 A | 2/1993 | Okayasu et al. |
| 5,696,555 A | 12/1997 | Kashimura |
| 6,172,708 B1 | 1/2001 | Palmer |
| 6,317,315 B1 * | 11/2001 | Lee ................... G06F 1/1601 16/254 |
| 6,805,997 B1 | 10/2004 | Katayama |
| 6,839,511 B2 | 1/2005 | Nishida et al. |
| 7,306,878 B2 | 12/2007 | Takeshita et al. |
| 7,432,684 B2 | 10/2008 | Iwamoto |
| 7,465,516 B2 | 12/2008 | Nagura |
| 7,466,542 B2 | 12/2008 | Kuo et al. |
| 7,561,786 B1 | 7/2009 | Black |
| 7,653,301 B2 | 1/2010 | Nishizawa |
| 7,794,867 B2 | 9/2010 | Takeshita et al. |

(Continued)

FOREIGN PATENT DOCUMENTS

WO 2016/134318 A1 8/2016
WO 2017/106102 A1 6/2017

*Primary Examiner* — Ahmed A Berhan
(74) *Attorney, Agent, or Firm* — Stinson LLP

(57) ABSTRACT

A camera including first and second modules combinable to form the camera. The first module can be a camera module, and the second module can be a camera control module. In one embodiment, the camera module includes an image sensor, light source, and motion sensor, and the camera control module includes a power source receiver, camera control system, and image storage device port. The camera control module can be used separated from the camera module for functions such as viewing and editing images or camera settings.

40 Claims, 22 Drawing Sheets

(56) References Cited

U.S. PATENT DOCUMENTS

| | | | |
|---|---|---|---|
| 7,864,065 B2 | 1/2011 | Nakashima et al. | |
| 7,867,019 B1 | 1/2011 | Loukusa et al. | |
| 7,959,458 B2 | 6/2011 | Loukusa et al. | |
| 7,983,554 B2 | 7/2011 | Nishizawa | |
| 7,993,795 B2 | 8/2011 | Ishikawa | |
| 8,021,777 B2 | 9/2011 | Takeshita et al. | |
| 8,048,553 B2 | 11/2011 | Takeshita et al. | |
| 8,085,309 B1* | 12/2011 | Kelliher | G01S 19/19 348/211.2 |
| 8,199,188 B2 | 6/2012 | Amling et al. | |
| 8,199,251 B2 | 6/2012 | Woodman | |
| 8,325,270 B2 | 12/2012 | Woodman | |
| 8,345,429 B2 | 1/2013 | Kim et al. | |
| 8,368,356 B2 | 2/2013 | Nakashima et al. | |
| 8,432,127 B2 | 4/2013 | Takeshita et al. | |
| 8,461,799 B2 | 6/2013 | Takeshita et al. | |
| 8,477,238 B2 | 7/2013 | Jannard | |
| 8,525,924 B2 | 9/2013 | Jannard | |
| 8,525,925 B2 | 9/2013 | Jannard | |
| 8,617,741 B2 | 12/2013 | Takeshita et al. | |
| 8,638,392 B2 | 1/2014 | Woodman | |
| 8,773,581 B2 | 7/2014 | Jannard | |
| 8,792,050 B2 | 7/2014 | Shinohara et al. | |
| 8,802,280 B2 | 8/2014 | Takeshita et al. | |
| 8,913,179 B2 | 12/2014 | Jannard | |
| 9,019,397 B2 | 4/2015 | Jannard | |
| 9,034,515 B2 | 5/2015 | Takeshita et al. | |
| 9,190,640 B2 | 11/2015 | Sohn et al. | |
| 9,244,336 B2 | 1/2016 | Kim | |
| 9,419,260 B2 | 8/2016 | Takeshita et al. | |
| 9,425,443 B2 | 8/2016 | Takeshita et al. | |
| 9,462,176 B2 | 10/2016 | Kim | |
| 9,596,388 B2 | 3/2017 | Woodman | |
| 9,628,679 B2 | 4/2017 | Jannard | |
| 9,671,680 B2 | 6/2017 | Kamiya et al. | |
| 9,680,137 B2 | 6/2017 | Takeshita et al. | |
| 9,686,456 B2 | 6/2017 | Wu | |
| 9,699,360 B2 | 7/2017 | Woodman | |
| 9,712,728 B2 | 7/2017 | Jannard | |
| 9,917,285 B1 | 3/2018 | Motoyama et al. | |
| 9,972,812 B1 | 5/2018 | Motoyama et al. | |
| 10,084,165 B2 | 9/2018 | Fukushima et al. | |
| 10,116,776 B2 | 10/2018 | Jannard | |
| 10,148,908 B2 | 12/2018 | Odamaki et al. | |
| 10,194,071 B2 | 1/2019 | Lever et al. | |
| 10,254,629 B2 | 4/2019 | Matsuzawa et al. | |
| 10,261,396 B2 | 4/2019 | Ota et al. | |
| 10,356,291 B2 | 7/2019 | Woodman | |
| 2002/0022499 A1* | 2/2002 | Newman | H04M 1/0256 455/556.1 |
| 2002/0142212 A1* | 10/2002 | Bean | H01M 10/42 429/100 |
| 2002/0149695 A1* | 10/2002 | Kayanuma | H04N 1/00129 348/375 |
| 2004/0096207 A1* | 5/2004 | Nakatani | G03B 17/561 396/419 |
| 2004/0207604 A1* | 10/2004 | Chuang | G06F 1/1624 345/168 |
| 2005/0212912 A1* | 9/2005 | Uster | H04N 7/20 348/155 |
| 2005/0249486 A1* | 11/2005 | Murray | G03B 17/00 396/56 |
| 2007/0035647 A1 | 2/2007 | Inuiya | |
| 2007/0058051 A1 | 3/2007 | Suzuki | |
| 2009/0233660 A1* | 9/2009 | Demuynck | H04M 1/0247 455/575.4 |
| 2010/0091178 A1 | 4/2010 | Eromaki et al. | |
| 2016/0116945 A1* | 4/2016 | Guo | G06F 1/1656 361/679.11 |
| 2018/0088443 A1 | 3/2018 | Riddiford et al. | |
| 2018/0091707 A1 | 3/2018 | Jannard | |
| 2018/0095344 A1 | 4/2018 | Riddiford et al. | |
| 2018/0233717 A1 | 8/2018 | Motoyama et al. | |
| 2018/0233718 A1 | 8/2018 | Motoyama et al. | |
| 2018/0233719 A1 | 8/2018 | Motoyama et al. | |
| 2018/0246396 A1 | 8/2018 | Ota | |
| 2018/0246397 A1 | 8/2018 | Ota | |
| 2019/0037152 A1 | 1/2019 | Uda et al. | |
| 2019/0181509 A1 | 6/2019 | Ohtsuka et al. | |
| 2019/0281197 A1 | 9/2019 | Woodman | |
| 2019/0342474 A1 | 11/2019 | Woodman | |

* cited by examiner

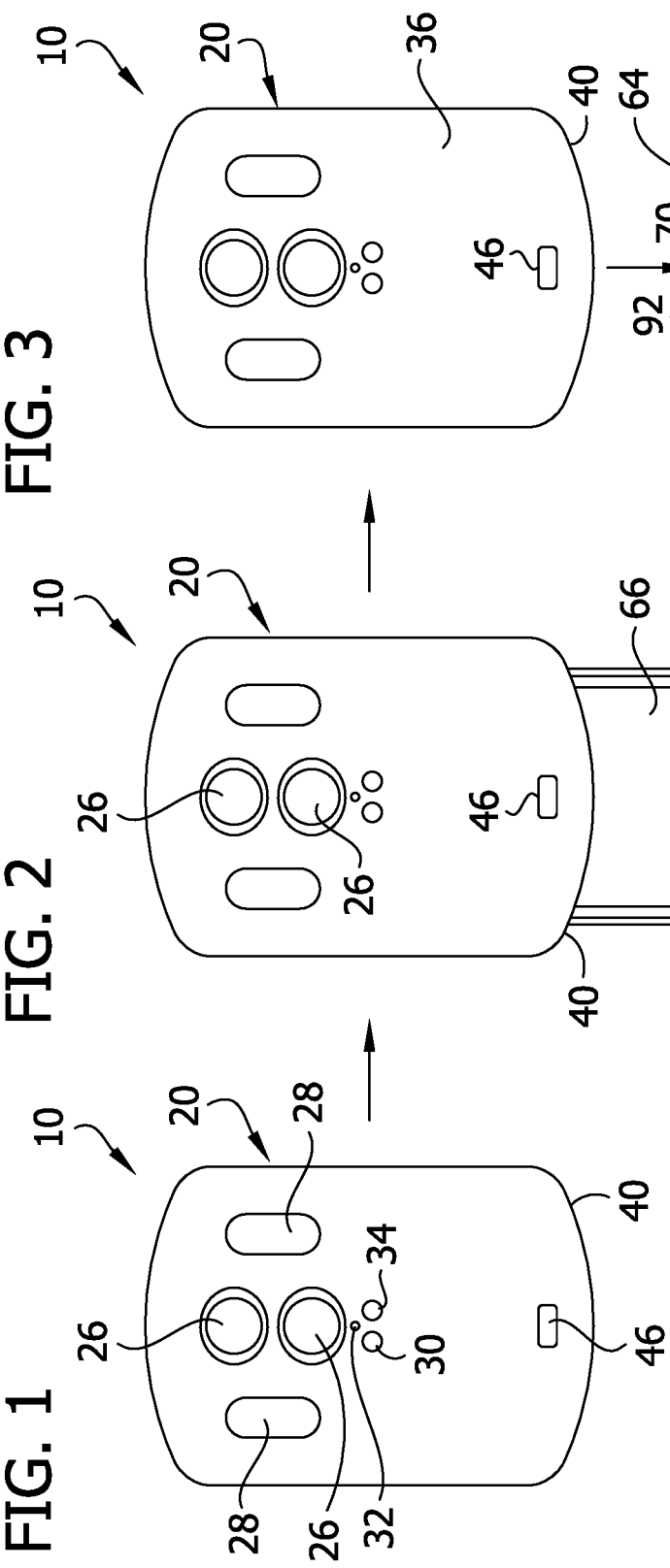

GAME CAMERA HAVING CAMERA CONTROL MODULE

CROSS-REFERENCE TO RELATED APPLICATION

The present application claims priority to U.S. Provisional Application No. 62/814,555, filed Mar. 6, 2019, which is hereby incorporated by reference in its entirety.

FIELD

The present disclosure generally relates to cameras, and more particularly to game cameras, trail cameras, security cameras, and other types of cameras.

BACKGROUND

Cameras commonly referred to as "game cameras" or "trail cameras" are mounted outdoors in locations where users would like to monitor movement of animals to be studied and/or hunted. Such cameras are commonly motion activated, such that the cameras are triggered to take photographs and/or video when motion is sensed in front of the camera. These types of cameras may also be used for security purposes, such as monitoring for trespassers.

SUMMARY

In one aspect, a camera comprises a camera control module and a camera module. The camera control module includes a control module body. The camera control module includes a user interface and a camera control system supported by the control module body. The user interface includes a user input. The camera control system includes a camera controller and a non-transitory tangible storage medium storing camera control instructions executable by the camera controller. The camera controller is responsive to the user input to change the camera control instructions stored on the tangible storage medium. The camera module includes a camera module body. The camera module includes an image sensor carried by the camera module body. The camera module includes a control module receiver configured to receive the camera control module for mounting the camera control module on the camera module. The camera control module includes a camera module connector. The camera module includes a control module connector. The camera module connector and control module connector are configured to connect to each other to communicatively couple the camera controller with the image sensor. The camera control instructions, when executed by the camera controller, when the camera module connector and control module connector are connected to each other, control operation of the image sensor.

In another aspect, a camera comprises an image sensor, a light source, and a camera control system. The camera control system comprises a user interface including a user input and a display. The camera control system includes a camera controller and a non-transitory tangible storage medium storing camera control instructions that, when executed by the camera controller, control operation of the image sensor and light source. The camera includes a housing supporting the image sensor, light source, user input, and display. The housing includes mounting structure configured to mount the housing to a support structure. The housing lacks an exterior door mounted by a hinge connection and pivotable about the hinge connection between a closed position in which the door covers a portion of the user interface and an open position in which the portion of the user interface is exposed for manipulation by a user.

In yet another aspect, a camera comprises an image sensor, a light source, and a camera control system. The camera control system comprises a user interface including a user input and a display. The camera control system includes a camera controller and a non-transitory tangible storage medium storing camera control instructions that, when executed by the camera controller, control operation of the image sensor and light source. The camera includes a camera body supporting the image sensor, light source, and camera control system. The camera body supports a power source receiver configured to receive a power source for providing electrical power to the image sensor, light source, and camera control system. The camera includes a battery holder configured to releasably hold at least one disposable battery. The battery holder is sized and shaped to be received by the power source receiver for providing electrical power to the image sensor, light source, and camera control system from the at least one disposable battery. The camera includes a rechargeable battery pack comprising a housing enclosing a rechargeable battery. The rechargeable battery pack is sized and shaped to be received by the power source receiver for providing electrical power to the image sensor, light source, and camera control system from the rechargeable battery. The battery holder and rechargeable battery pack are interchangeably receivable by the power source receiver for providing electrical power to the image sensor, light source, and camera control system using the battery holder or the rechargeable battery pack.

Other objects and features of the present disclosure will be in part apparent and in part pointed out herein.

BRIEF DESCRIPTION OF THE DRAWINGS

FIG. 1 is a front elevation of a first embodiment of a camera of the present disclosure;

FIG. 2 is a front elevation of a the camera showing a camera control module partially removed form a camera module;

FIG. 3 is a front elevation of the camera showing the camera control module removed from the camera module;

Corresponding reference characters indicate corresponding parts throughout the drawings.

DETAILED DESCRIPTION

Referring to FIGS. 1-3, a camera of the present disclosure is indicated generally by the reference number 10. For example, the camera 10 may be referred to as a "game camera" or a "trail camera" and mounted outdoors in a location where a user would like to monitor movement of animals to be studied and/or hunted. The camera 10 may also be used for security purposes, such as monitoring for trespassers. It will be appreciated that the camera 10 can be used for other purposes without departing from the scope of the present disclosure.

The camera 10 includes a camera module 20 and a camera control module 22. The camera module 20 includes some components of the camera 10, and the camera control module 22 includes other components of the camera. The control module 22 can be docked on the camera module 20 to combine the control module and camera module for functioning together as the camera 10. In some embodiments, when the control module 22 is separated from the camera module 20, the control module is usable for various functions, as will be explained.

Figure 6:
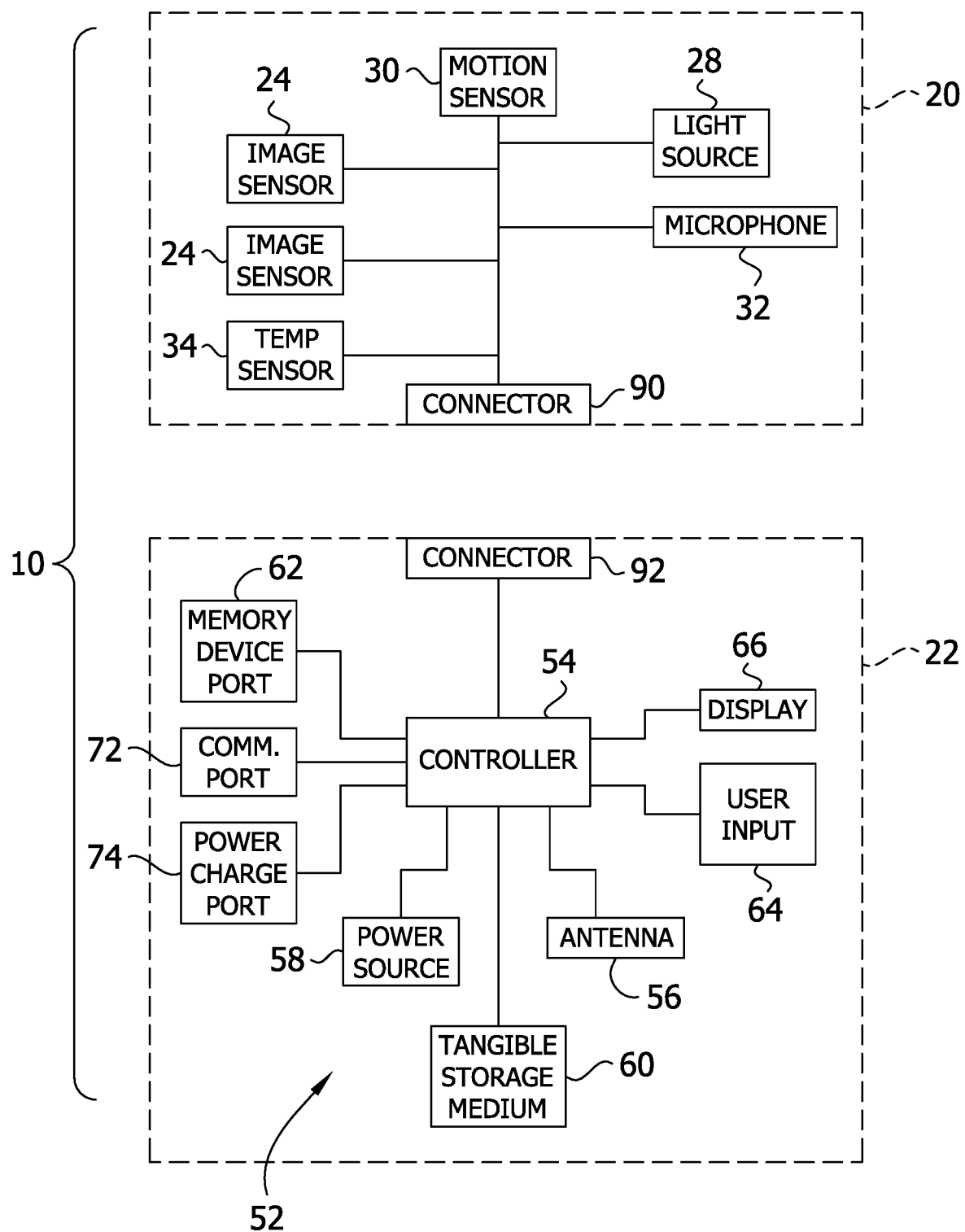
FIG. 6 is a schematic of the camera showing electronic components thereof.

The camera module 20 includes at least one image sensor 24 (FIG. 6) and associated lens 26, a light source 28, and a motion sensor 30 (e.g., PIR sensor). The camera module 20 could include additional and/or other combinations of components without departing from the scope of the present disclosure. In the illustrated embodiment, two image sensors 24 with associated lenses 26 are provided. One image sensor 24 is for taking daylight images and the other for taking night images. Images could include photographs and/or videos. The light source 28 can include one or more light emitting elements, such as LEDs. The camera module 20 can also include a microphone 32 (e.g., for recording sound for video images) and temperature sensor 34 (e.g., for marking images with temperature measurements). The camera module 20 includes a camera module body 36 defining a housing that houses the image sensors 24, light source 28, motion sensor 30, and microphone 32.

The camera module body 36 defines a receiver having a cavity in which the control module 22 is receivable to dock the control unit on the camera module 20. In the illustrated embodiment, the camera module body 36 has a lower opening 40 through which the control module 22 can be inserted into the cavity. Desirably, the control module 22 is slidable into the cavity and is releasably retained in the cavity by a retainer. For example, the retainer could include one or more latches arranged to automatically engage and retain the control module 22 in the cavity when the control module is inserted in the cavity. A release 46 (e.g., release button or lever, etc.) is provided for releasing the retainer to permit the control module 22 to be removed from the camera module body 36. One or more springs could be provided in the camera module body 36 to eject the control module 22 from the camera module body 36 when the release 46 is actuated. The camera module body 20 can include a mount (e.g., one or more brackets, fasteners, threaded openings, or other mounting structure) for mounting the camera module body on a suitable support such as a tree, post, or other support structure.

Figure 4:
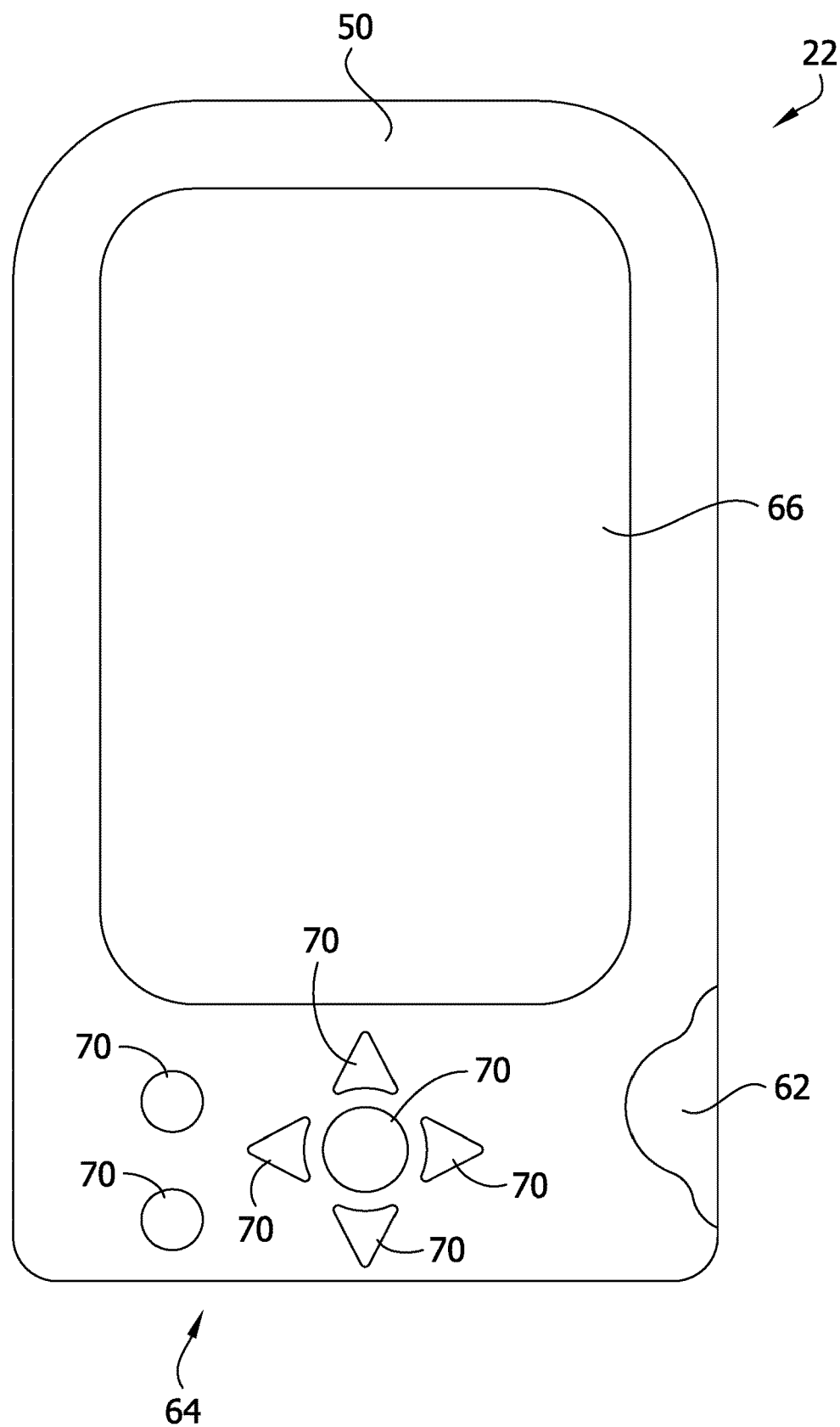
FIG. 4 is a front elevation of the camera control module.
Figure 5:
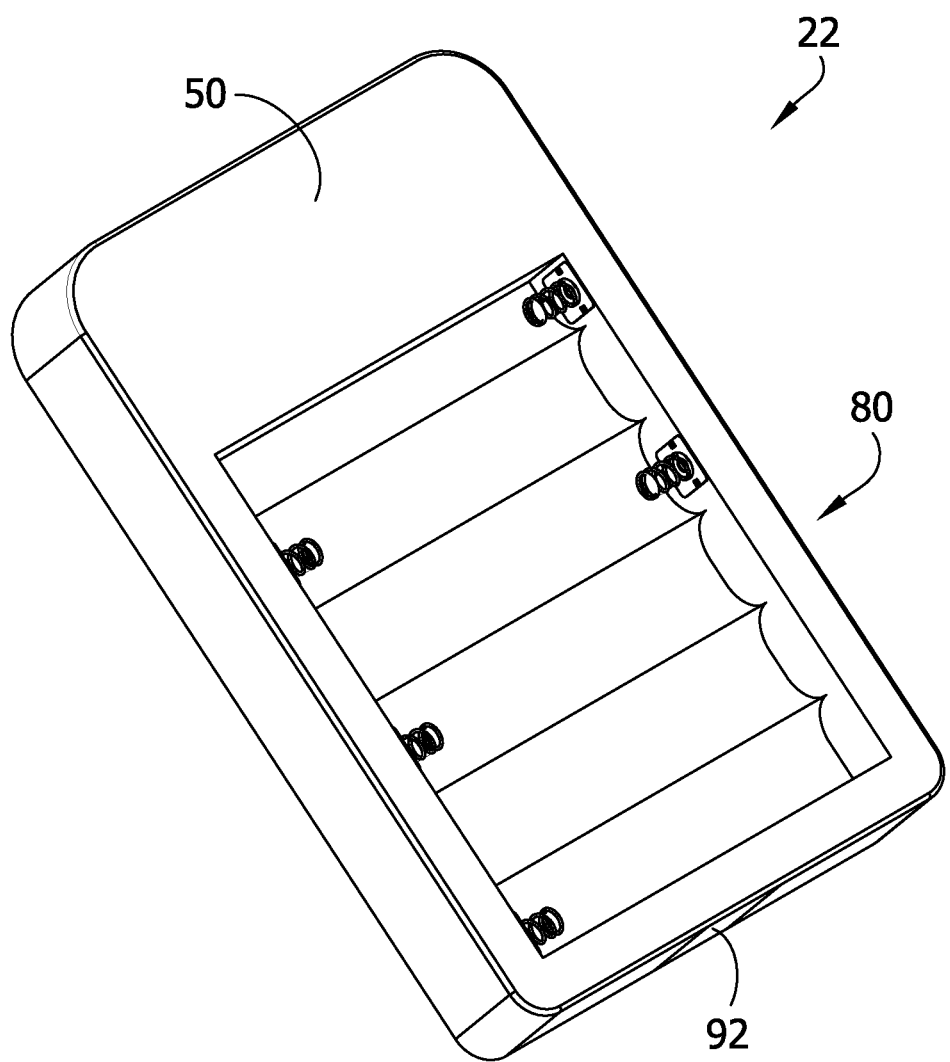
FIG. 5 is a rear elevation of the camera control module.

Referring to FIGS. 3-5, the control module 22 includes a control module body 50 that houses various components of the control module, such as control system components. As shown schematically in FIG. 6, a control system 52 of the control module 22 can include one or more of the following components: a camera controller 54 (e.g., processor), an antenna 56 (e.g., transceiver), a power source 58 (e.g., one or more batteries), a tangible storage medium 60 (e.g., including forms of storage such as software and/or firmware), a memory device port 62 (e.g., SD or micro SD card port), and/or a user interface including a user input 64 and a display 66. For example, one or more printed circuit boards can be configured to include the camera controller 54 and the storage medium 60. The camera controller 54 is configured to read and execute instructions stored in the storage medium 60, and is responsive to the user input 64, to control operation of the control module 22 and/or camera 10 (e.g., one or all electronic components thereof). A user can enter and/or modify instructions stored on the storage medium 60 via the user input 64. In the illustrated embodiment, the user input 64 includes several buttons 70 (broadly, "actuators"), and the display 66 is a liquid crystal display. The buttons 70 can be configured for different functions, such as power (on/off), mode, menu, menu navigation, enter, tag image, favorite image, etc. The antenna 56 can be used for various forms of communication, such as wireless fidelity communication, near field communication (e.g., Bluetooth), cellular communication, etc. In some embodiments, multiple antennas 56 may be provided for different forms of these or other types of communication. The control module 22 can also include a communication port 72 (e.g., USB or micro USB port) for wired transmission of signals (e.g., including data, images, settings, etc.) to/from the control module 22 (e.g., downloading images from the control unit to a computer or smart device) and a power/charge port 74 for powering the control unit via an electrical outlet and/or for charging the power source 58.

As shown in FIG. 5, the control module 22 can include a power source holder 80 for holding the power source 58. For example, the power source holder 80 can be configured to hold a plurality of batteries or a battery pack. The control unit 22 can include a cover (not shown) for covering the power source 58 held in the power source holder 80.

For operatively connecting the camera module 20 and the control module 22, the camera module includes a control module connector 90 (FIG. 6) inside the control module receiving cavity, and the control module 22 includes a camera module connector 92 (FIGS. 3-6). The control module connector 90 and the camera module connector 92 are configured to connect to each other to form a power and/or communication bridge between the camera module 20 and the control module 22. The connectors 90, 92 can include connecting structure for forming the communication bridge that is different from or the same as connecting structure for forming the power bridge. When the control module connector 90 and camera module connector 92 are connected, the electronic components of the camera module 20 are in electrical communication with the power source 58 for powering the electronic components of the camera module, and the electronic components of the camera module are in communication with the electronic components of the control module 22 for sending and/or receiving signals (e.g., images, data, settings, etc.) therebetween. The connectors 90, 92 can each include multiple connectors (e.g., one or more connectors for power connection, and one or more connectors for signal communication connection).

In a method of using the camera 10, a user can program the camera using the control module 22 separated or undocked from the camera module 20. The user can view camera settings (e.g., camera mode, camera name, date, time, image capture delay, image capture duration, image capacity, battery level, megapixel setting, etc.) on the display 66 and select, change, and/or save settings to the tangible storage medium 60 using the user input 64. When the user has finished programming the control module 22, the control module is docked on the camera module 20. While the control module 22 is docked on the camera module 20, the image sensors 24, light source 28, motion sensor 30, and microphone 32 are controlled by the controller 54 according to the settings (broadly, "camera control instructions") stored in the tangible storage medium 60. Over the course of hours, day, months, etc., images from the image sensors 24 are stored on a storage device (e.g., SD card) connected to the memory device port 62. When the user returns to the camera 10, the control module 22 is undocked from the camera module 20. The user can manipulate the user input 64 to view images on the display 66 from the storage device connected to the port 62. The user can also connect the control module 22 to a computer, tablet, smart phone, or other smart device using the communication port 72 and a suitable cable, or using the antenna 56, to view and/or download the images to the smart device, download camera data, or change camera settings, etc. The storage device may be cleared or exchanged for a new storage device before re-docking the control module 22 on the camera module 20 to capture additional images.

With the control module 22 docked on the camera module 20 or undocked from the camera module, the antenna 56 can be used to wirelessly communicate with other devices. For example, images from the storage device (in port 62) can be transmitted by the antenna 56 to another device (e.g., smart phone) via wireless fidelity communication, near field communication, cellular communication, or another type of communication. Moreover, while the control module 22 is docked or undocked with respect to the camera module 20, the camera settings can be viewed and/or modified by another device (e.g., smart phone), and camera data can be downloaded to the other device, via the antenna 56 using wireless fidelity communication, near field communication, cellular communication, and/or another type of communication.

In some embodiments, the camera module body 36 can include a door (not shown) to provide access to the control module receiving cavity such that the control module 22 can be installed/removed from the cavity when the door is open and can be enclosed in the camera module body 20 when the door is closed. In other embodiments, the door may or may not be used for installing/removing the control unit 22 and provides access to the control unit while it is docked on the camera module 20. For example, the camera module body 36 could include a door (e.g., hinged front door) that could be opened to view part or all of the display 66 and/or user input 64 of the control module 22 when the control module is docked on the camera module body 20 such that the control module could be manipulated by a user while it is docked on the camera module. In one contemplated embodiment, a portion of the display 66 is covered by the camera module body 36 when the door is open, and the controller 54 operates the display 66 to display information on the display in a different format (e.g., smaller format) to use the uncovered portion of the display rather than the full display. The controller 54 may operate the display 66 in the reduced format based on a sensed connection of the camera body 20 and control unit 22 (e.g., via the connectors 90, 92).

Referring to FIGS. 7-22, a second embodiment of a camera of the present disclosure is indicated generally by the reference number 110. The camera of this second embodiment is similar to the camera 10 described above, and like components are referred to with like reference numbers, plus 100. For example, the camera 110 includes a camera module 120 and a camera control module 122. The camera module 120 includes some components of the camera 110, and the camera control module 122 includes other components of the camera. The control module 122 can be docked on the camera module 120 to combine the control module and camera module for functioning together as the camera 110. When the control module 122 is separated from the camera module 120, the control module is usable for various functions.

Figure 7:
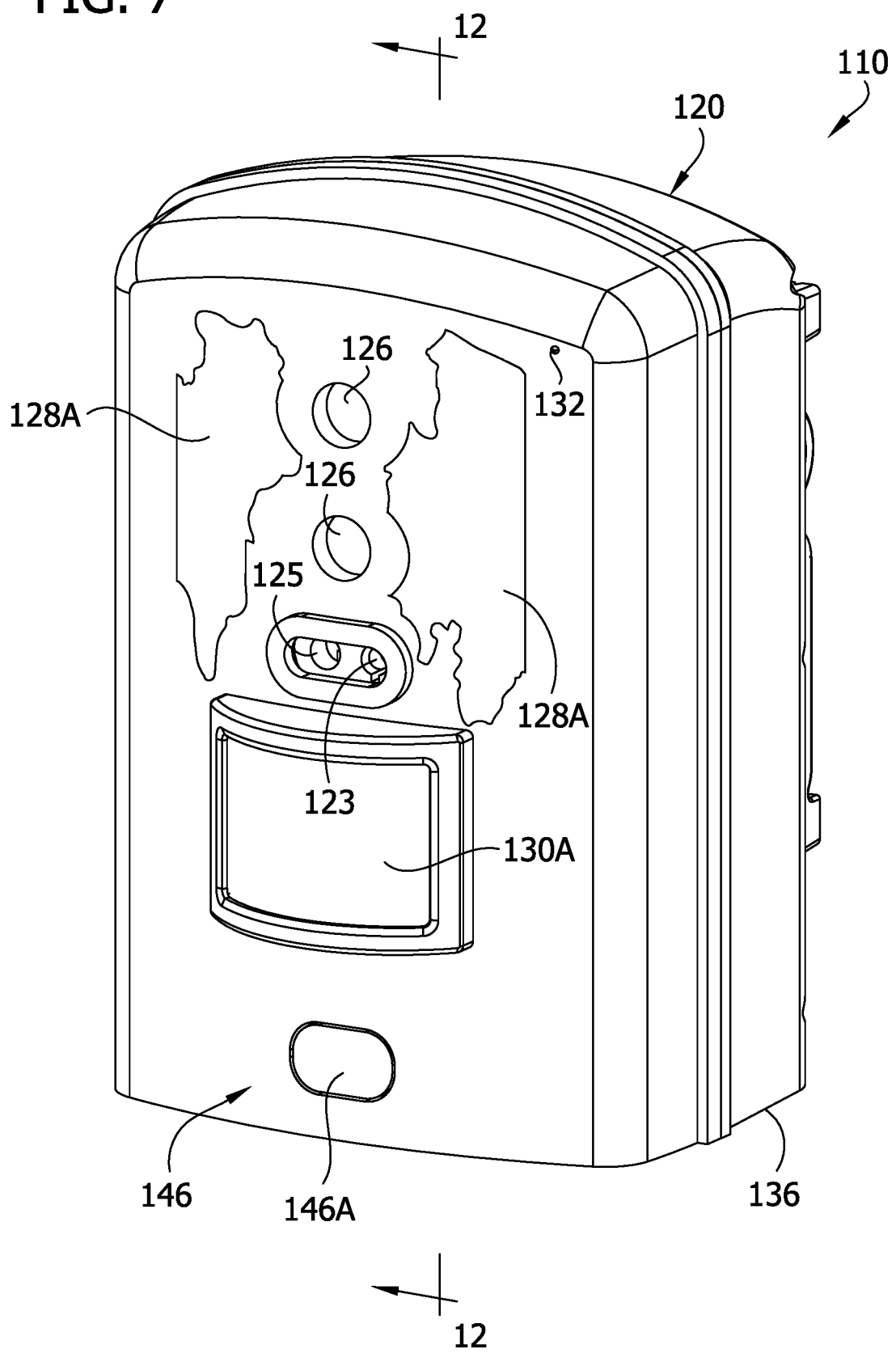
FIG. 7 is a front perspective of a second embodiment of a camera of the present disclosure.
Figure 8:
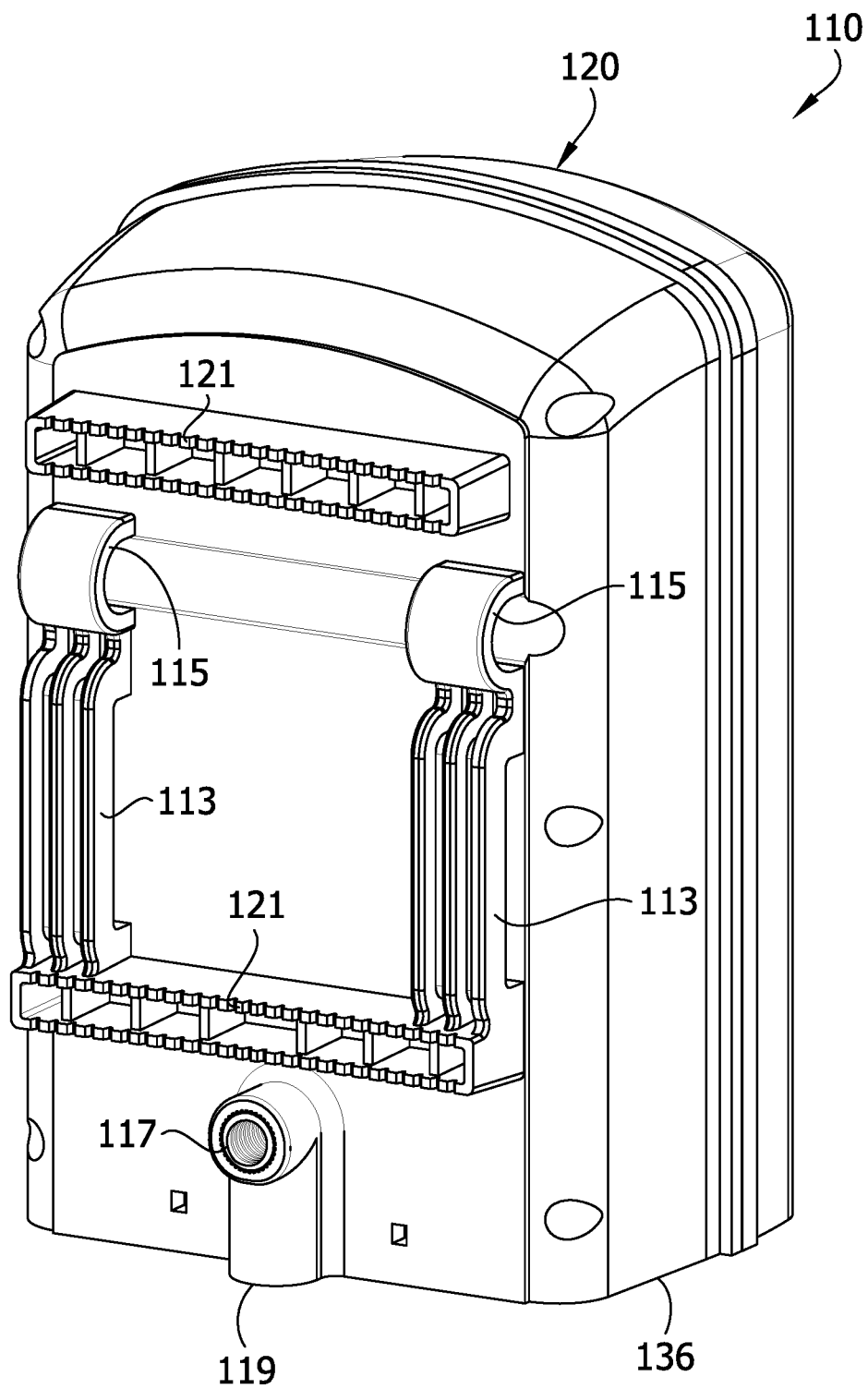
FIG. 8 is a rear perspective of the camera of FIG. 7.
Figure 9:
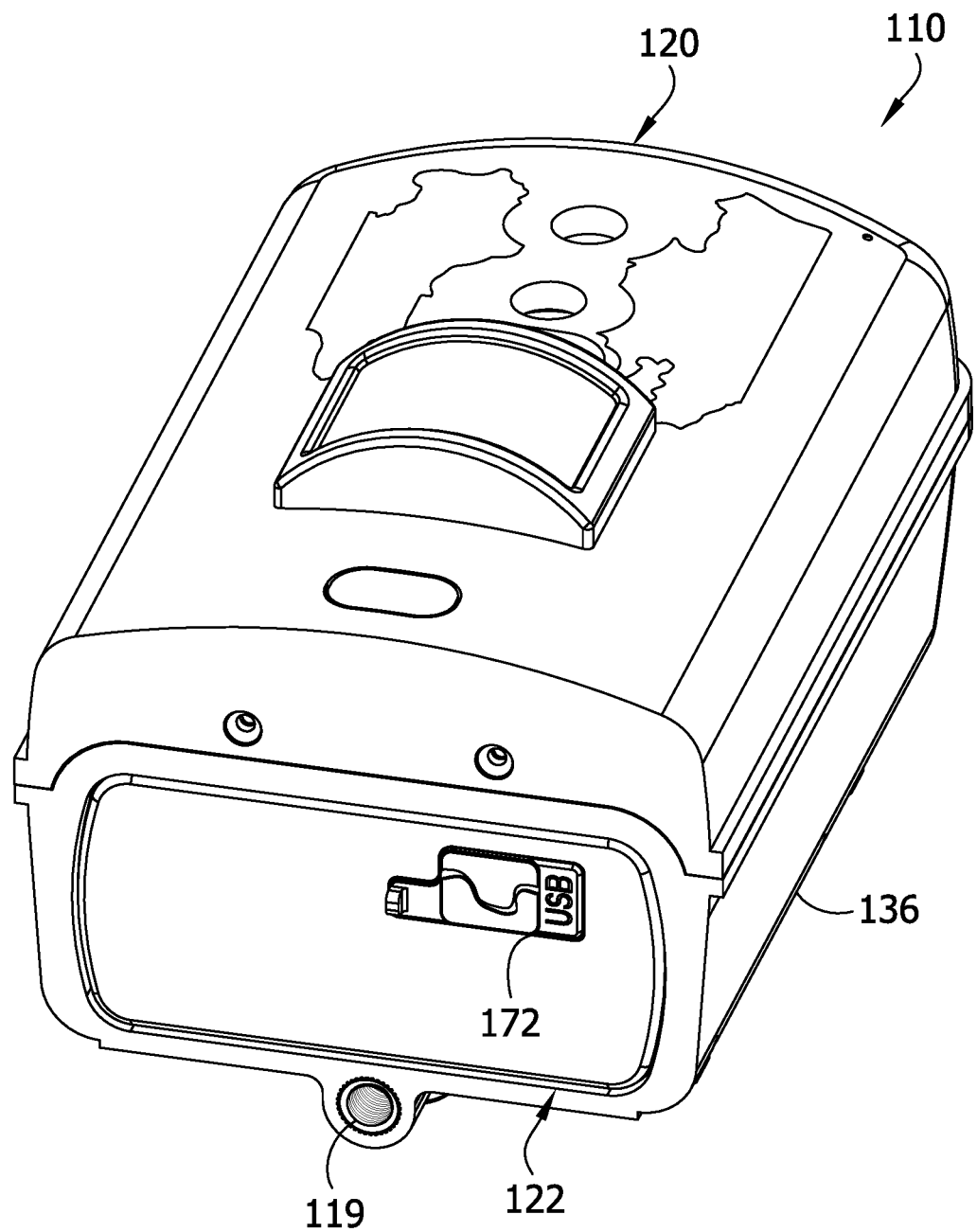
FIG. 9 is a bottom perspective of the camera.
Figure 10:
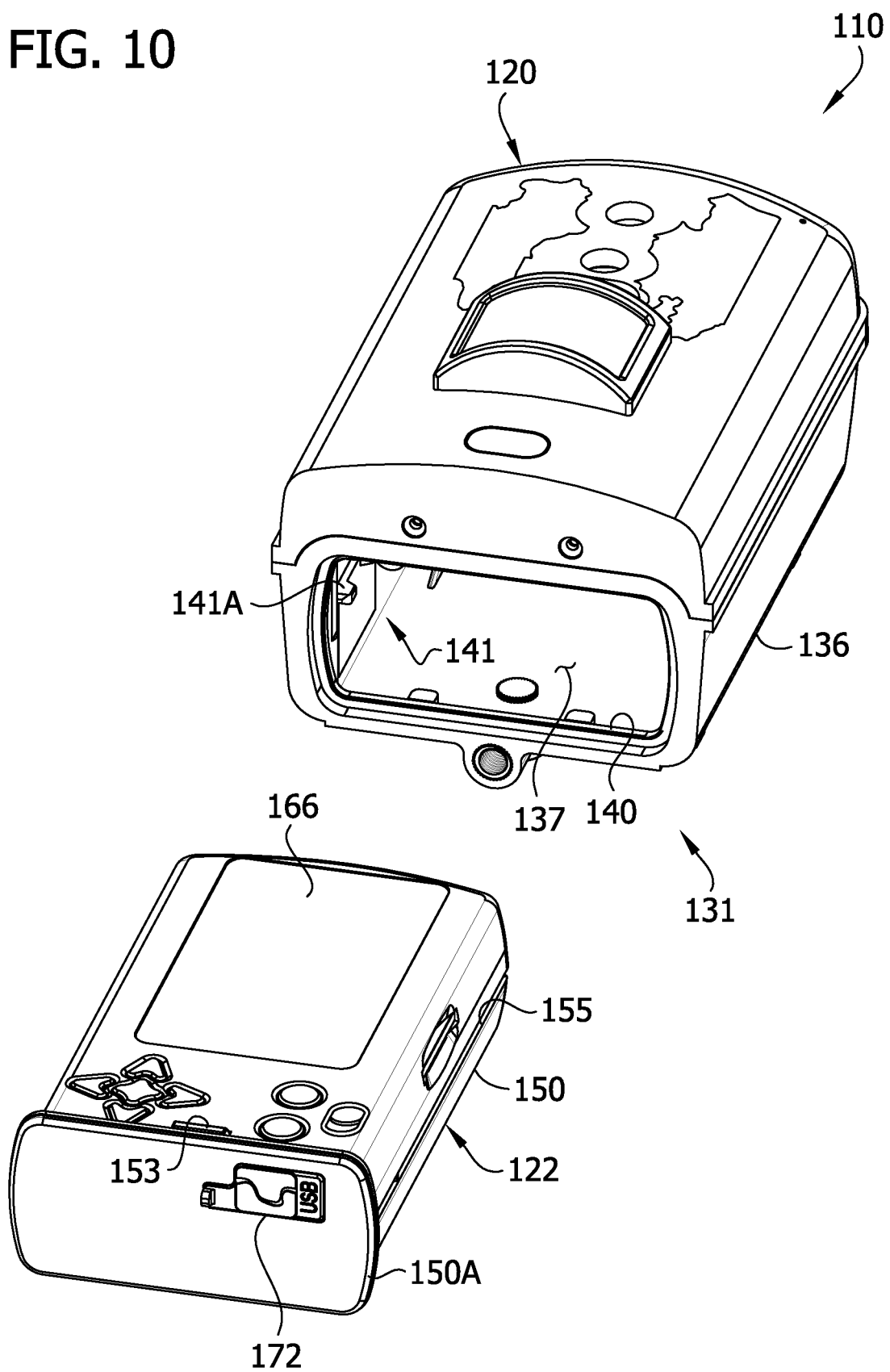
FIG. 10 is a bottom perspective of the camera showing a camera control module removed from a camera module.
Figure 11:
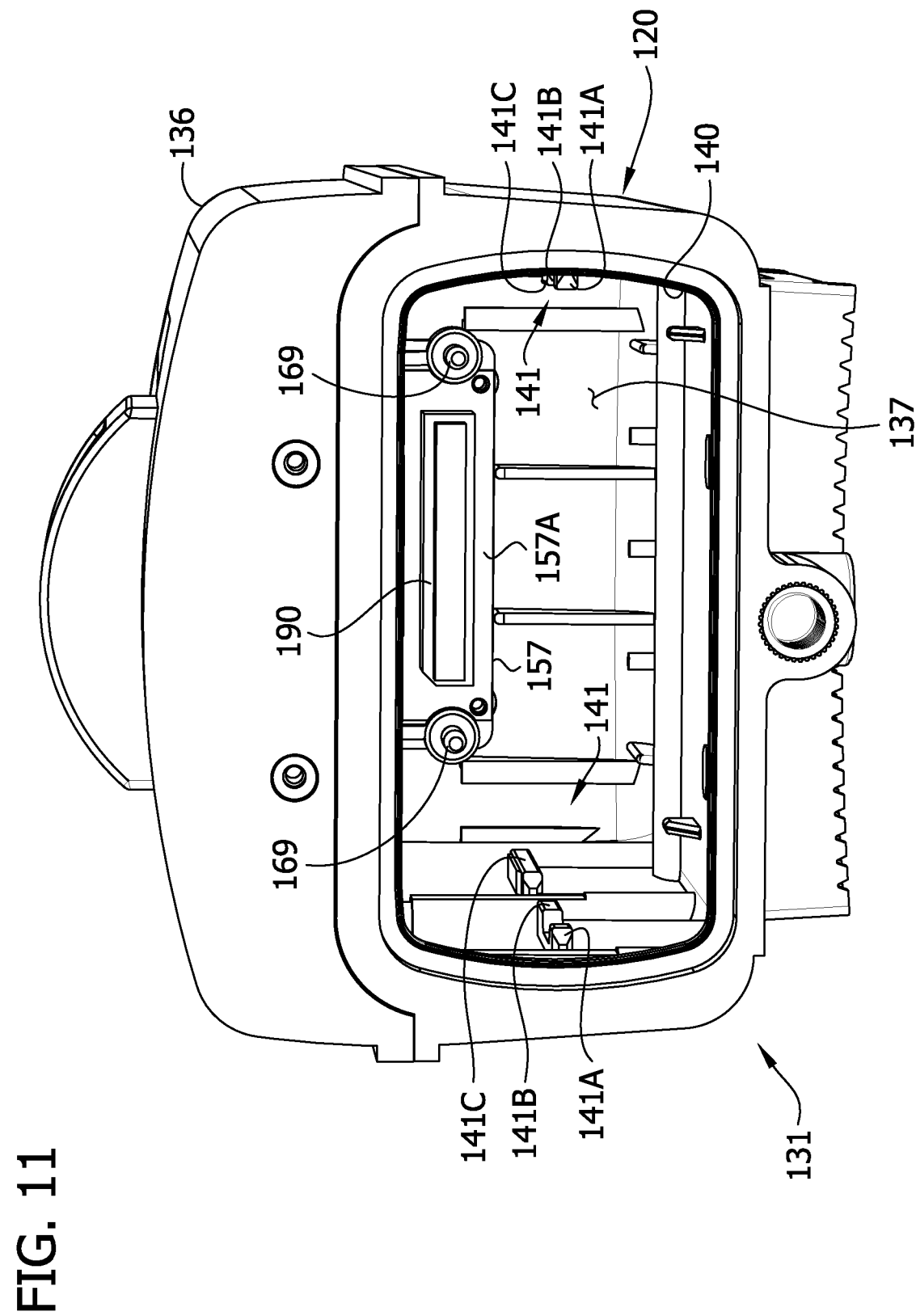
FIG. 11 is a bottom perspective of the camera module.

The camera module 120 includes a camera module body 136 having a front face, a rear face, left and right sides, a top and a bottom. In FIG. 7, the front face is facing out of the page and to the left. Referring to FIG. 8, the rear face includes mounting structure comprising a plurality of mounts, one or more of which could be used to mount the camera on a suitable support structure such as a tree, post, etc. In the illustrated embodiment, a first mount comprises first and second strap receivers 113 spaced from each other and defining respective strap receiving openings for receiving a strap threaded therethrough and which could be wrapped around a tree or other support structure. A second mount comprises first and second cable receivers 115 spaced from each other and defining respective cable receiving openings for receiving a cable (e.g., security cable) threaded therethrough to be wrapped around a support structure. Third and fourth mounts 117, 119 are provided in the form of threaded sockets configured to receive a threaded fastener to mount the camera on the threaded fastener (which may itself be supported by suitable support structure). Upper and lower braces 121 are provided for engaging surfaces of the support structure (e.g., surfaces of a tree) to stabilize the camera module body 136 on the support surface when strapped and/or cabled to the tree. Other types of mounting structure (e.g., brackets, fasteners, clamps, clips, etc.) can be used without departing from the scope of the present disclosure.

The camera module 120 includes image sensors 124 (FIG. 13) and associated lenses 126, a light source 128, and a motion sensor 130 (e.g., PIR sensor covered by a lens 130A). The camera module 120 could include additional and/or other combinations of components without departing from the scope of the present disclosure. One image sensor 124 is for taking daylight images and the other image sensor 124 is for taking night images. In other embodiments, only one image sensor may be provided. Images could include photographs and/or videos. The light source 128 can include one or more light emitting elements, such as LEDs, located behind respective lenses 128A. The camera module 120 can also include a microphone 132 (e.g., for recording sound for video images) and temperature sensor 134 (e.g., for marking images with temperature measurements). The camera module 120 further comprises a day/night sensor 123 for determining whether the daylight image sensor 124 or night image sensor 124 should be used, and an indicator 125 (e.g., LED) for indicating an operational status of the camera (e.g., armed, low battery, etc.). The camera module body 136 defines a housing that houses the image sensors 124, light sources 128, motion sensor 130, microphone 132, and other components. The image sensors 124, light sources 128, and motion sensor 130 are mounted in the camera module body 136 on one or more printed circuit boards 127 and are arranged to face forward through or from the front face of the camera module body.

The camera module body 136 defines a control module receiver 131 having a cavity 137 in which the control module 122 is receivable to dock the control unit on the camera module 120. In the illustrated embodiment, the camera module body 136 has a lower opening 140 in the bottom of the camera module body through which the control module 122 can be inserted into the cavity 137. The cavity 137 is bounded by a rear wall and left and right side walls of the camera module body 136 and by a partition 133 mounted in the camera module body behind the printed circuit boards 127 mounting the image sensor 124, light sources 128, and other components. The control module 122 has an undocked or separated position (e.g., FIG. 10) and a docked position (e.g., FIGS. 9, 12) with respect to the camera module 120. In the docked position, the control module 122 is received by the receiver 131 and is located in the cavity 137 and closes the bottom opening 140.

The receiver 131 includes a guide to assist with properly orienting and locating the control module 122 in the cavity 137. In the illustrated embodiment, the guide comprises first and second tracks 141 on opposite left and right sides of the cavity 137. Each track includes a first track segment 141A, a second track segment 141B, and a third track segment 141C. The track segments 141A-141C are provided in the form of ribs spaced from each other and protruding into the cavity 137 for interfacing with the camera control module 122, as explained in further detail below. The track segments 141A-141C of respective tracks 141 are aligned with one another along track axes along which the camera control module is guided in the cavity 137. The receiver 131 includes a keeper 145 in the form of a flange protruding into the cavity 137 for releasably retaining the camera control module 122 in the cavity, as will be explained. The receiver 131 includes a peripheral edge margin extending around the opening 140 in the bottom of the camera module body 136 against which the control module 122 bears in the docked position to close the opening 140. A release 146 is provided for releasing the control module 122 to permit the control module to be removed from the camera module body 136. In the illustrated embodiment, the release 146 comprises a button 146A biased forward by a spring 146B. The release 146 includes a pusher 146C movable rearward in response to pushing of the button 146A rearward against the spring bias to release the control module 122, as will be explained further below.

Figure 15:
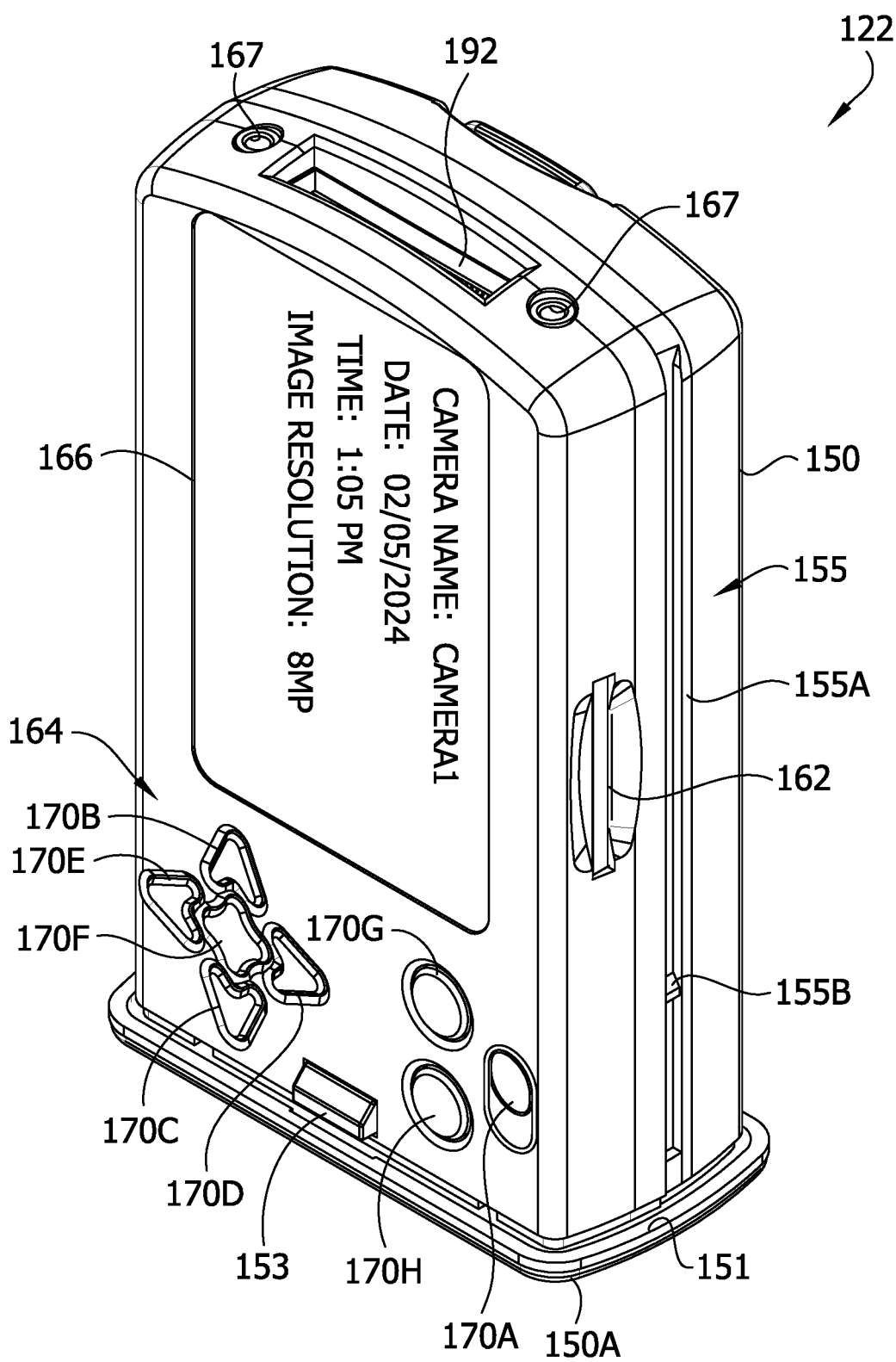
FIG. 15 is a front perspective of the camera control module.

The control module 122 includes a control module body 150 that houses various components of the control module, such as control system components. The control module body 150 has a front face, a rear face, a top, a bottom, and left and right sides. In FIG. 15, the front face is shown facing out of the page and to the left. In the illustrated embodiment, the majority of the control module body 150 is sized and shaped to be receivable in the cavity 137. The bottom of the control module body 150 closes the cavity 137 and forms part of a bottom wall of the camera 110. In the illustrated embodiment, the control module body 150 includes a lower peripheral flange 150A that defines a lip configured to overlie and engage the peripheral edge margin of the opening 140 in the bottom of the camera module body 136 to close the opening. A gasket 151 is carried by the flange 150A to be captured between the flange and camera module body 136 to form a seal at the closure of the opening 140.

Figure 22:
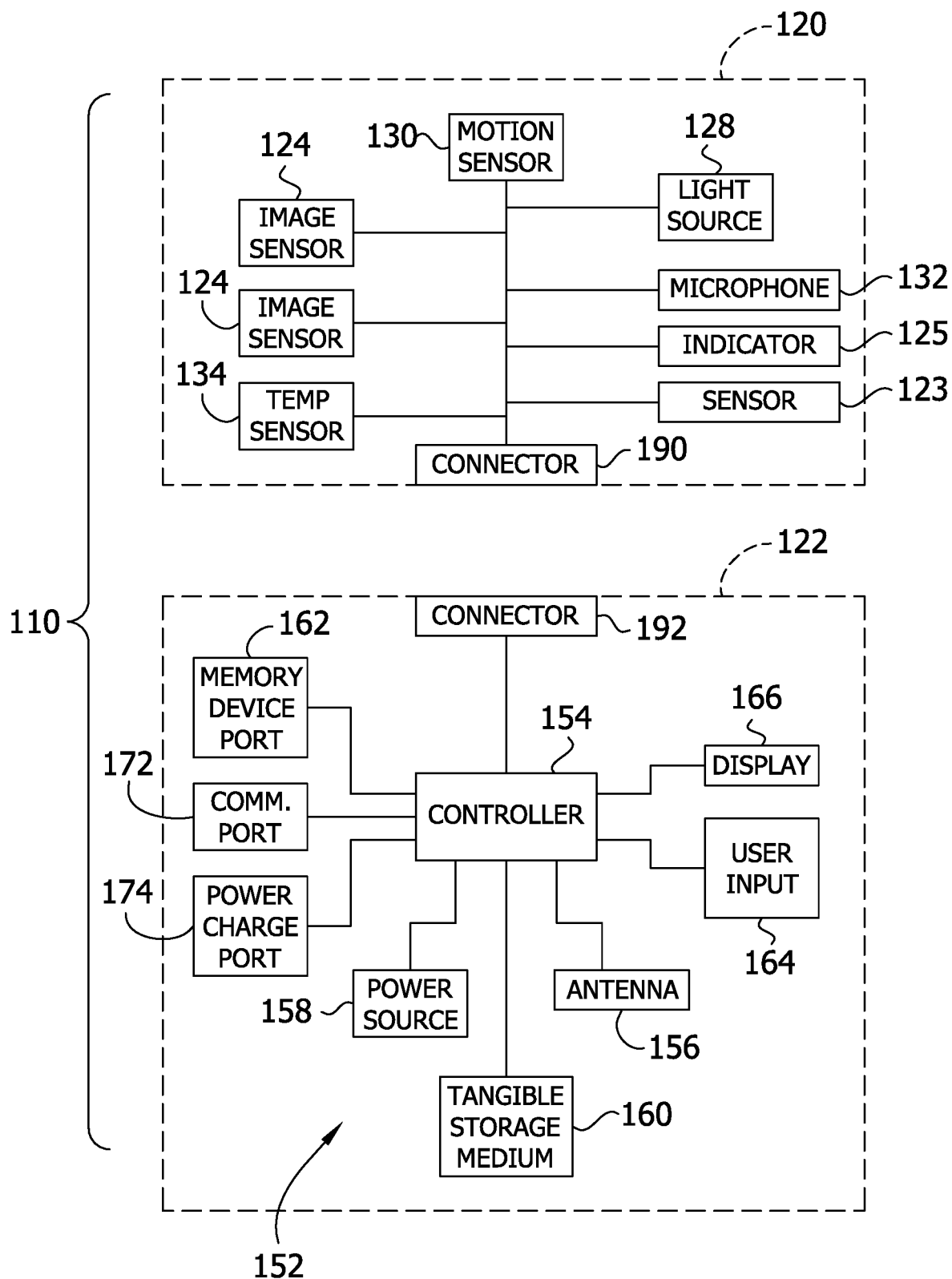
FIG. 22 is a schematic of the camera showing electronic components thereof.

As shown schematically in FIG. 22, a control system 152 of the control module 122 can include one or more of the following components: a camera controller 154 (e.g., processor), an antenna 156 (e.g., transceiver), a power source 158 (e.g., one or more batteries), a tangible storage medium 160 (e.g., including forms of storage such as software and/or firmware), a memory device port 162 (e.g., SD or micro SD card port), and/or a user interface including a user input 164 and a display 166. For example, one or more printed circuit boards 127 can be configured to include the camera controller 154 and the storage medium 160. The camera controller 154 is configured to read and execute instructions stored in the storage medium 160, and is responsive to the user input 164, to control operation of the control module 122 and/or camera 110. A user can enter and/or modify instructions stored on the storage medium 160 via the user input 164. In the illustrated embodiment, the user input 164 includes several buttons 170 (broadly, "actuators"), and the display 166 is a liquid crystal display. The buttons 170 can be configured for different functions, such as power (on/off), mode, menu, menu navigation, enter, tag image, favorite image, etc. The antenna 156 can be used for various forms of communication, such as wireless fidelity communication, near field communication (e.g., Bluetooth), cellular communication, etc. In some embodiments, multiple antennas 156 may be provided for different forms of these or other types of communication. In one example, an antenna 156 is threaded into a threaded antenna socket (not shown) in the bottom wall of the control module body 150 and protrudes from the antenna socket (e.g., downward), such that the antenna is exposed outside the camera module when the control module is docked and can also be used by the control module when it is not docked on the camera module. The control module 122 can also include a communication port 172 (e.g., USB or micro USB port) for wired transmission of signals (e.g., including data, images, settings, etc.) to/from the control module 122 (e.g., downloading images from the control unit to a computer or smart device) and a power/charge port 174 for powering the control unit via an electrical outlet and/or for charging the power source 158.

Referring to FIG. 15, in the illustrated embodiment, the user input 164 includes an on/off slide button 170A, left and right navigation buttons 170B, 170C, an up navigation button 170D which also functions as an image tag button, a down navigation button 170E which also functions as an image information display button, a select or "OK" button 170F which also functions as an image view zoom button, a back button 170G, and a trash or discard image button 170H. The buttons 170 are usable for various purposes, including navigation of a control menu, locating, viewing, and changing camera settings, and viewing, tagging, and discarding photos. An example menu screen showing camera settings on the display 166 is shown in FIG. 15 (including camera name, date, time, image resolution, etc.). The buttons 170 can be used to navigate such menu screens to view, select, modify, and/or save camera settings. The buttons 170 can also be used to view on the display 166 images saved on a memory device or image storage device (e.g., SD card) connected to the port 162. For example, the left and right navigation buttons 170B, 170C can be used to navigate stored images. A user can tag photos using the tag button 170D (which stores data on the image storage device noting the tag or favorite indication) and can delete unwanted photos using the delete button 170H. For example, a user can scroll through images of game animals, tagging images of interest, and deleting images of non-target animals and/or images not showing animals. These are some of the functions a user may perform with the control module 122 while it is separated from the camera module 120.

Figure 12:
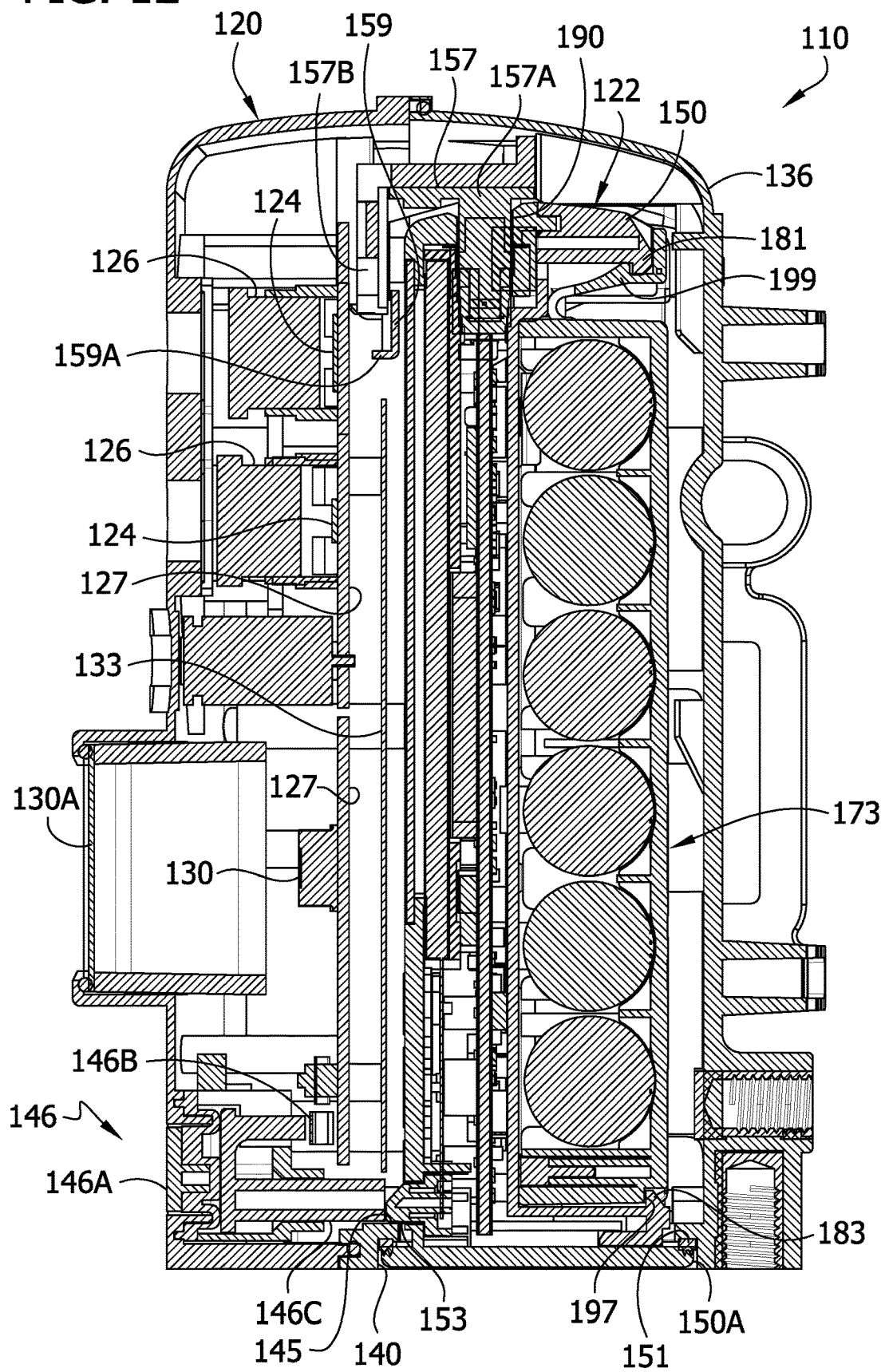
FIG. 12 is a section of the camera taken in a plane including line 12-12 of FIG. 7.
Figure 13A:
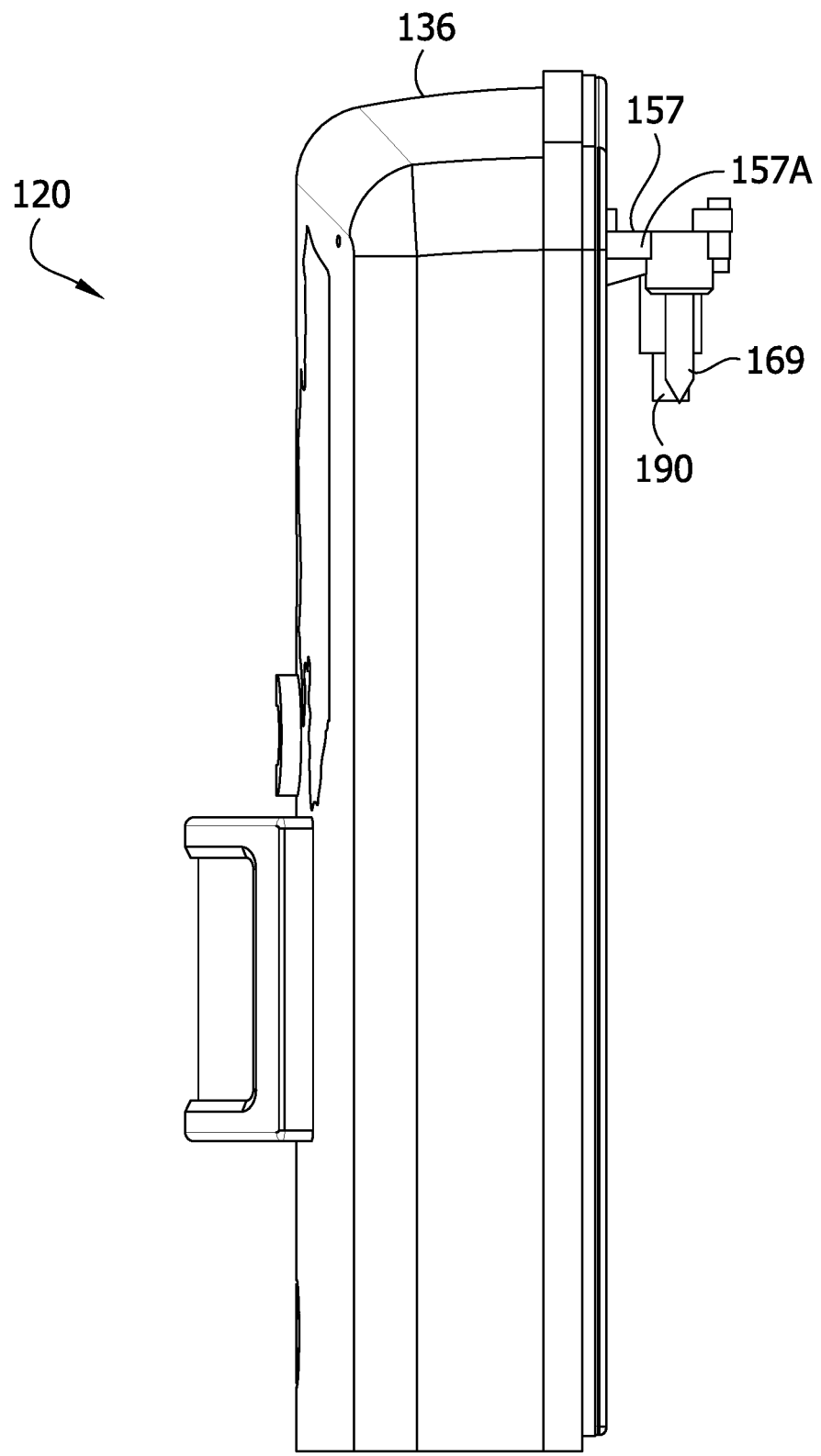
FIG. 13A is a fragmentary side elevation of the camera module showing a connector thereof in an extended position.
Figure 13B:
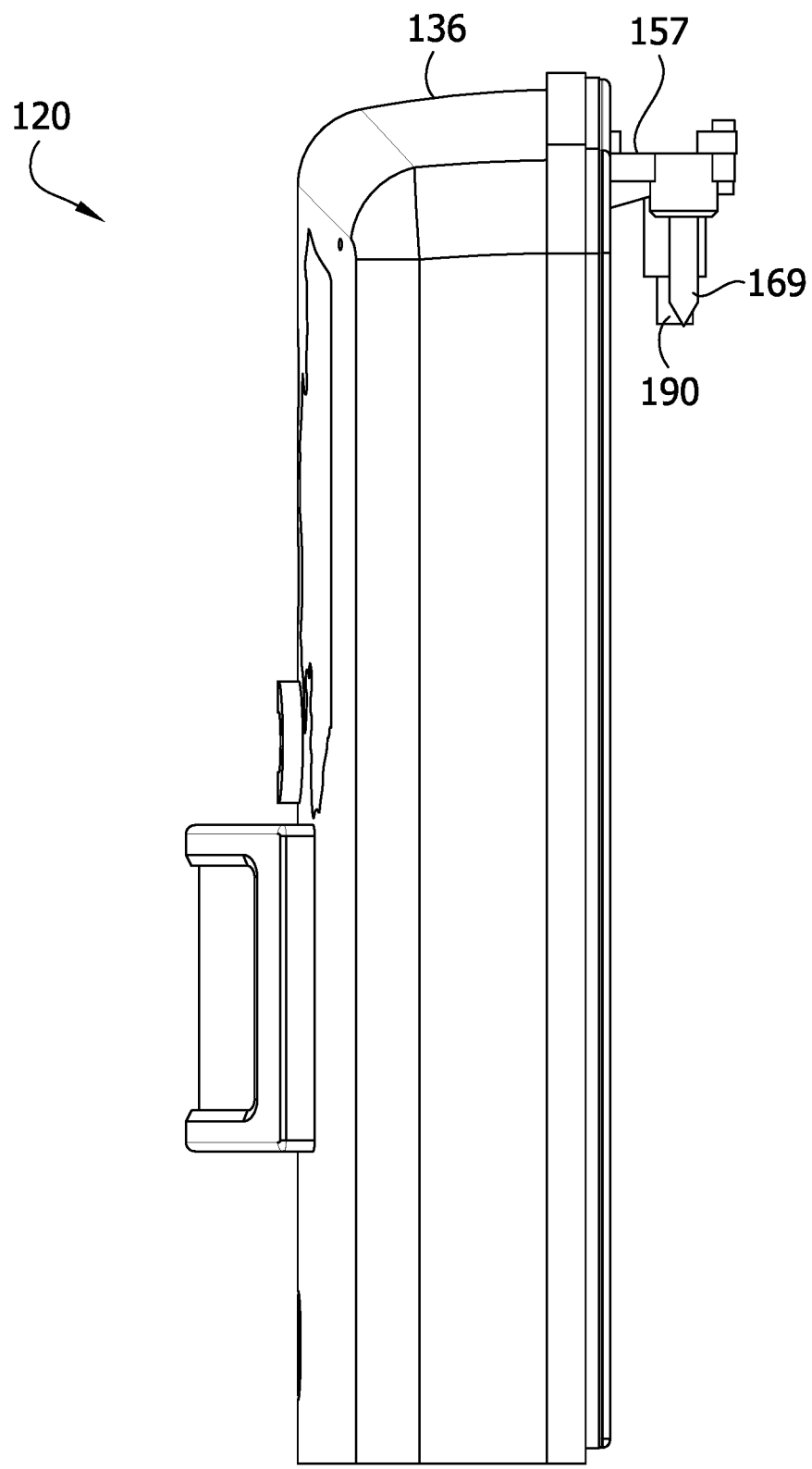
FIG. 13B is a view similar to FIG. 13A but showing the connector in a retracted position.
Figure 14A:
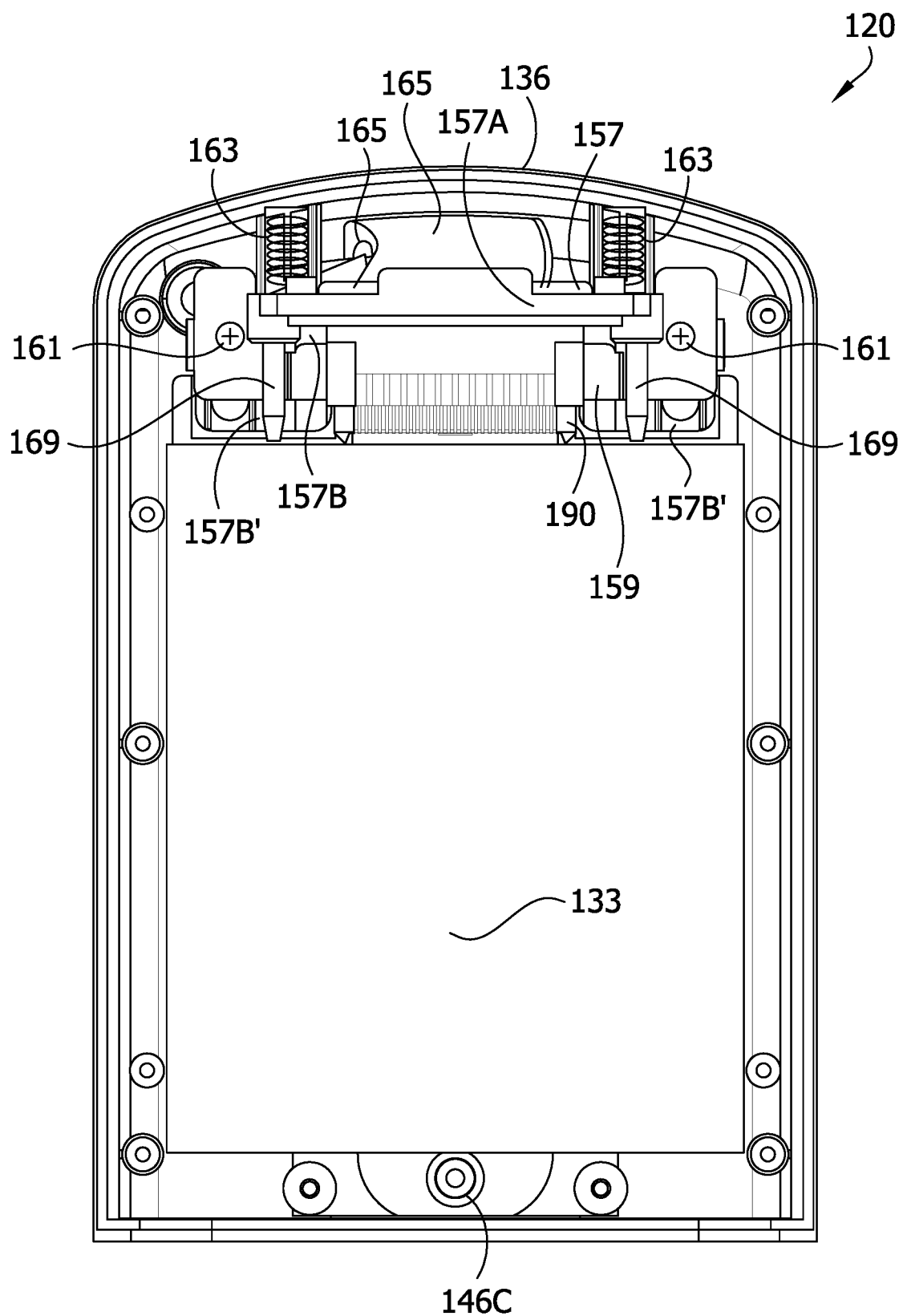
FIG. 14A is fragmentary rear elevation of the camera module corresponding to the view of FIG. 13A.
Figure 14B:
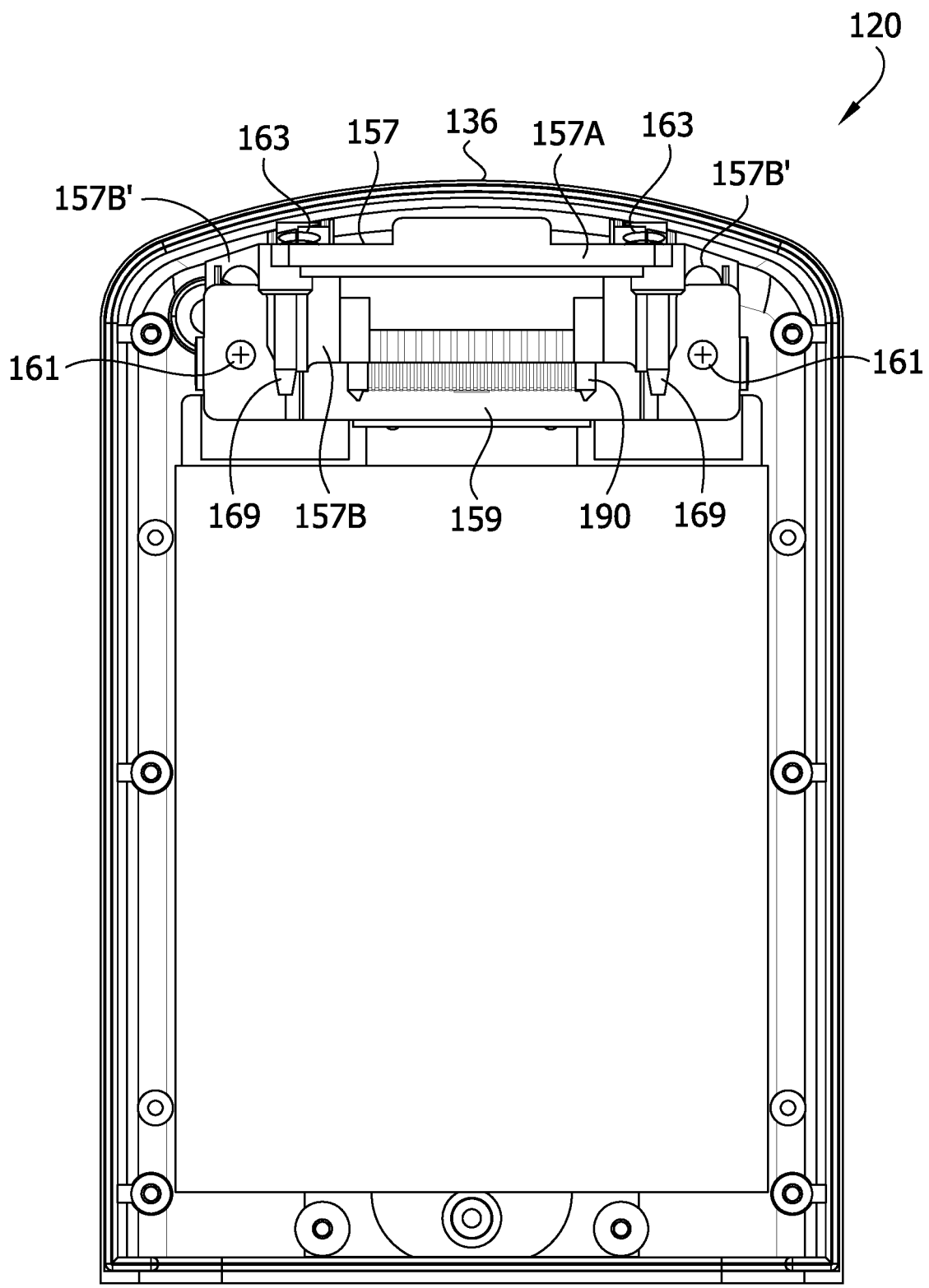
FIG. 14B is a view similar to FIG. 14A but corresponding to the view in FIG. 13B.

To dock the control module 122 on the camera module 120, the control module is slidable into the cavity 137 (e.g., along a slide axis parallel to the axes of the tracks 141) and is releasably retained in the cavity in the docked position by a retainer 153. In the illustrated embodiment, the retainer 153 comprises a spring biased latch of the camera control module. Referring to FIG. 12, the latch 153 is located to engage the keeper 145 in the cavity 137 when the control module 122 is in the docked position. As the control module 122 is moved into the cavity 137 toward the docked position, the spring biased latch 153 temporarily deflects to pass the keeper 145 and then resiliently extends to a retaining position (FIG. 12) in the cavity in which the latch engages the keeper 145.

The camera control module 122 includes followers 155 configured to interface with the guides 141 of the camera module 120 to facilitate proper docking of the control module on the camera module. In the illustrated embodiment, the followers 155 comprise channels 155A on the left and right sides of the control body 150. The channels 155A extend along a height of the control body and are configured to mate with the ribs defining the tracks 141. The channels 155A are offset rearward on the control module body 150 such that they are closer to the rear face than the front face of the control module body. The offset arrangement of the channels 155A requires a user to install the control module 122 in the cavity 137 with the front face of the control module facing in the same direction as the front face of the camera module 120. If the user attempts to insert the control module body 150 in the cavity 137 with the rear face of the control module facing the same direction as the front face of the camera module 120, the tracks will not align with the channels 155A and obstruct the control module body from fully entering the cavity. The followers 155 include protrusions or detents 155B that interrupt the channels 155A to interact with the first track segments for reasons explained below.

For operatively connecting the camera module 120 and the control module 122, the camera module includes a control module connector 190 (FIGS. 11-14, 23) inside and at an upper end of the control module receiving cavity 137, and the control module 122 includes a camera module connector 192 (FIGS. 12, 15, 23) at the top of the control module body 150. The control module connector 190 and the camera module connector 192 are configured to connect to each other to form a power and/or communication bridge between the camera module 120 and the control module 122. The connectors 190, 192 can include connecting structure for forming the communication bridge that is different from or the same as connecting structure for forming the power bridge. In the illustrated embodiment, the control module connector 190 comprises a male connector, and the camera module connector 192 comprises a female connector. The connectors 190, 192 may comprise a plurality of pins or contacts that engage corresponding pins or contacts of the other connector when the connectors are connected. When the control module connector 190 and camera module connector 192 are connected, the electronic components of the camera module 120 are in electrical communication with the power source 158 for powering the electronic components of the camera module, and the electronic components of the camera module are in communication with the electronic components of the control module 122 for sending and/or receiving signals (e.g., images, data, settings, commands, sensor signals, other communications, etc.) therebetween. The connectors 190, 192 can each include multiple connectors (e.g., one or more connectors for power connection, and one or more connectors for signal communication connection). Moreover, the connectors 190, 192 may be configured to form a non-contact or wireless connection without departing from the scope of the present disclosure.

In the illustrated embodiment, the control module connector 190 is movably supported by the camera module body 136 to facilitate docking of the control module 122 on the camera module 120. Referring to FIGS. 11-14, the control module connector 190 is mounted on a carrier 157 movable between an extended position (e.g., FIGS. 13A, 14A) and a retracted position (e.g., FIGS. 12, 13B, 14B). The carrier 157 is captured by a brace 159 fastened to the camera module body 136 by two fasteners 161 (e.g., screws). The carrier 157 includes a first carrier segment 157A extending rearward and to which the connector 190 is mounted. The carrier 157 includes a second carrier segment 157B extending downward and including two wings 157B' on its left and right sides. The fasteners 161 pass through vertical slots in the wings 157B'. Two springs 163 are captured in recesses in the camera body 150 and have lower ends engaging upper surfaces of the carrier 157. The arrangement is such that the springs 163 bias the carrier 157 and thus the control module connector 190 downward toward the extended position. An intermediate portion of the second carrier segment 157B between the two wings 157B' engages a forward extending flange 159A of the brace 159, and/or the fasteners 161 bottom out in upper ends of the vertical slots in the wings 157B', to locate the carrier 157 and connector 190 in the extended position. The carrier 157 is movable upward against the bias of the springs 163 to the retracted position. In particular, the vertical slots permit the carrier 157 to slide upward with respect to the fasteners 161, and the brace 159 is configured to permit upward sliding of the carrier, to move the control module connector 190 to the retracted position. A flexible tether 165 operatively connects the control module connector 190 to electronic components of the camera module 120 for providing a flexible power and/or communications connection from the control module connector to permit movement of the connector 190. In one example, the flexible tether 165 comprises one or more ribbons comprising electrical wires extending from the electrical contacts of the connector 190 to one or more of the electronic components and/or printed circuit boards of the camera module 120.

The control module 122 and camera module 120 include connection stabilizing structure configured to engage each other when the control module is docked on the camera module to facilitate and stabilize the connection of the connectors 190, 192. In the illustrated embodiment, the connection stabilizing structure of the control module 122 comprises two sockets 167 comprising bushings received in recesses in the control module body 150, and the connection stabilizing structure of the camera module 120 comprises rods 169 (broadly, "protrusions") extending downward from the connector carrier 157. The arrangement is such that as the connectors 190, 192 are moved toward each other, the rods 169 are received by the sockets 167 to form a mating engagement of the rods and sockets. The rods 169 have tapered free ends to assist in locating the rods in the sockets 167 and in guiding the camera module connector 192 into alignment with the control module connector 190 for proper engagement of the connectors.

In view of the description above, it will be appreciated that the camera control module 122 can be docked on the camera module 120 by orienting the top of the control module body 150 to enter the cavity 137, and then moving the control module upward to move the control module body into the cavity until the control module is docked on the camera module. As the control module body 150 moves upward, the channels 155A receive and slide along the tracks 141. Eventually, the detents 155B engage and slide past the first track segments 141A into a space between the first track segments and the second track segments 141B, the connectors 190, 192 mate, and the rods 169 mate with the sockets 167. Further upward movement of the control module 122 is needed to move the retainer 153 into retaining position with respect to the keeper 145, and to sandwich the gasket 151 between the control body flange 150A and the peripheral edge margin around the bottom opening 140 of the cavity 137. When the connectors 190, 192 first mate, the control module connector is in its extended position, and upward movement of the mated connectors occurs when the user continues to push the control module 122 upward, compressing the springs 163 biasing the control module connector. As the springs 163 compress, the mated connection of the connectors 190, 192 moves upward, the spring-biased latch 153 temporarily deflects to pass the keeper 145. When the bottom flange 150A of the control module body 150 presses the gasket 151 against the camera module body 136, the spring-biased latch 153 passes the keeper 145 and resiliently extends into its retaining position. The control module 122 is thus fully docked on the camera module 120, forming communication, power, and physical retaining connections between the control module 122 and camera module 120. The control module 122 is turned on before docking, and upon docking, the control module initiates control of the electronic components of the camera module 120 and thus initiates operation of the camera 110 (e.g., execution of the camera control instructions causes the camera controller 154 to control the various electronic components of the camera module 122 and control module 122 to capture images according to the saved camera settings).

To undock the control module 122, a user presses the release button 146A, which causes the pusher 146C to push the latch 153 against its spring bias. When the latch 153 clears the edge of the keeper 145, the springs 163 biasing the control module connector 190 push the control module 122 downward for ejecting the control module from the cavity 137. The detents 155B interrupting the channels 155A engage upper ends of the first track segments 141A to prevent the control module 122 from completely ejecting out of the cavity 137. A user can completely remove the control module 122 by pulling the control module to move the detents 155B past the first track segments 141A and then continue sliding the control module out of the cavity 137.

It will be appreciated that the user interface 164 of the camera is enclosed in the camera module body 136 when the camera control module 122 is docked, and the user interface is accessible to a user when the control module is separated from the camera module 120. In the illustrated embodiment, the camera module 120 body lacks an exterior door mounted by a hinge connection and pivotable about the hinge connection to cover and expose a user interface of the camera. Many conventional game cameras have such doors for permitting the user to access the user interface. However, it will be appreciated that cameras according to the present disclosure could include such doors.

Figure 20:
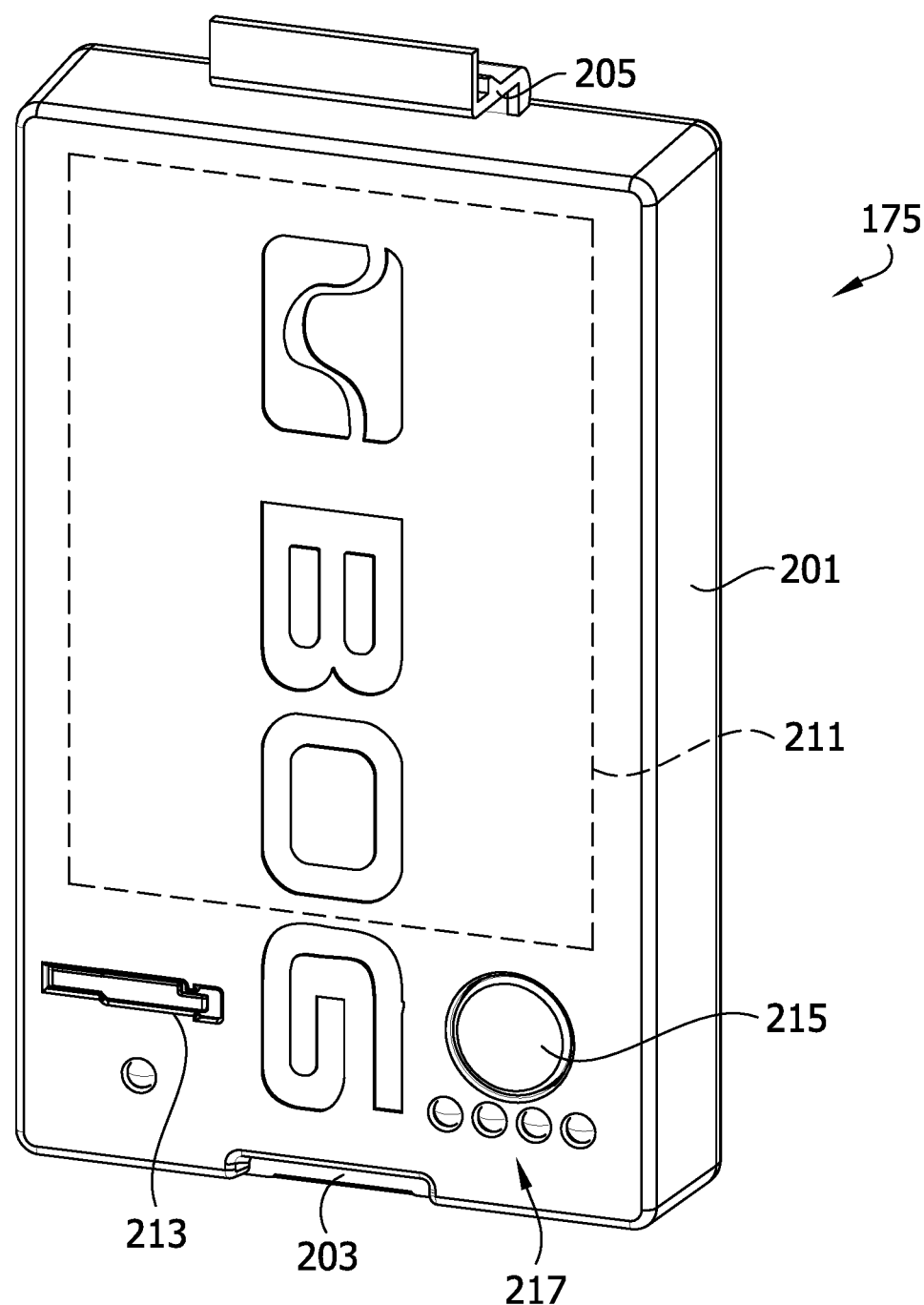
FIG. 20 is a rear elevation of a rechargeable battery pack interchangeable with the battery holder of FIG. 19.
Figure 21:
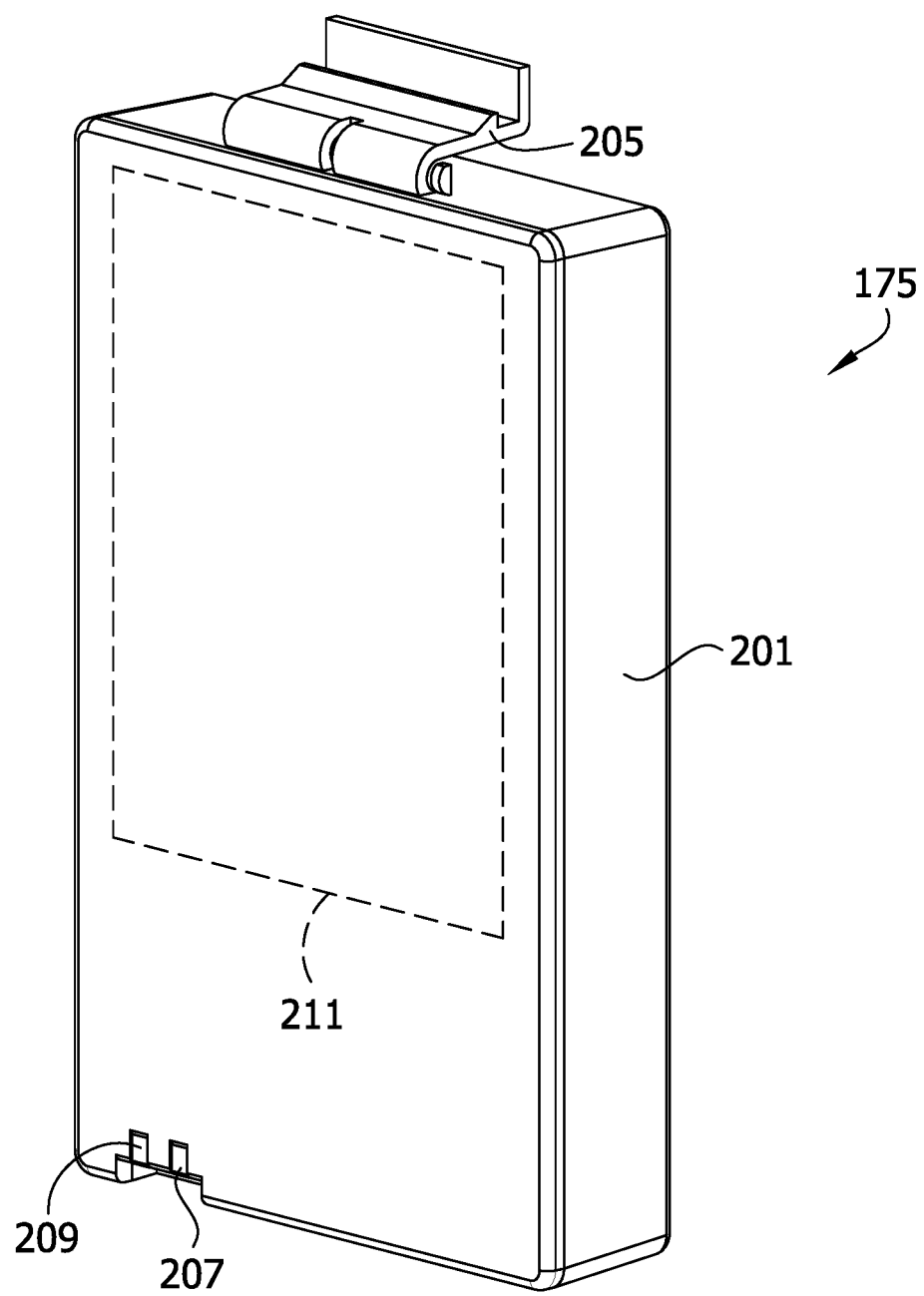
FIG. 21 is a front elevation of the rechargeable battery pack.

The control module 122 includes a power source receiver 171 configured to receive a power source to provide power to the electronic components of the control module 122 and the camera module 120. In the illustrated embodiment, the power source receiver 171 is configured to interchangeably receive a battery holder 173 (FIGS. 16, 19) and a rechargeable battery pack 175 (FIGS. 20, 21). The user can select whether to use disposable batteries 177 (e.g., AA or AAA batteries) with the battery holder 173, or to use the rechargeable battery pack 175, to power the camera 110. Referring to FIG. 17, the power source receiver 171 includes a well 179 in the back face of the control module body 150. The well 179 is bounded by walls defined by the control module body 150 and has a rear opening. The receiver 171 includes upper and lower retainers 181, 183 on upper and lower walls bounding the well 179. The receiver 171 also includes first, second, and third electrical contacts 185, 187A, 187B. In the illustrated embodiment, the first electrical contact 185 is a positive contact adjacent a bottom of the well 179, the second electrical contact 187A is a negative electrical contact located adjacent a top of the well, and the third electrical contact 187B is an alternate negative electrical contract located adjacent the bottom of the well.

Figure 16:
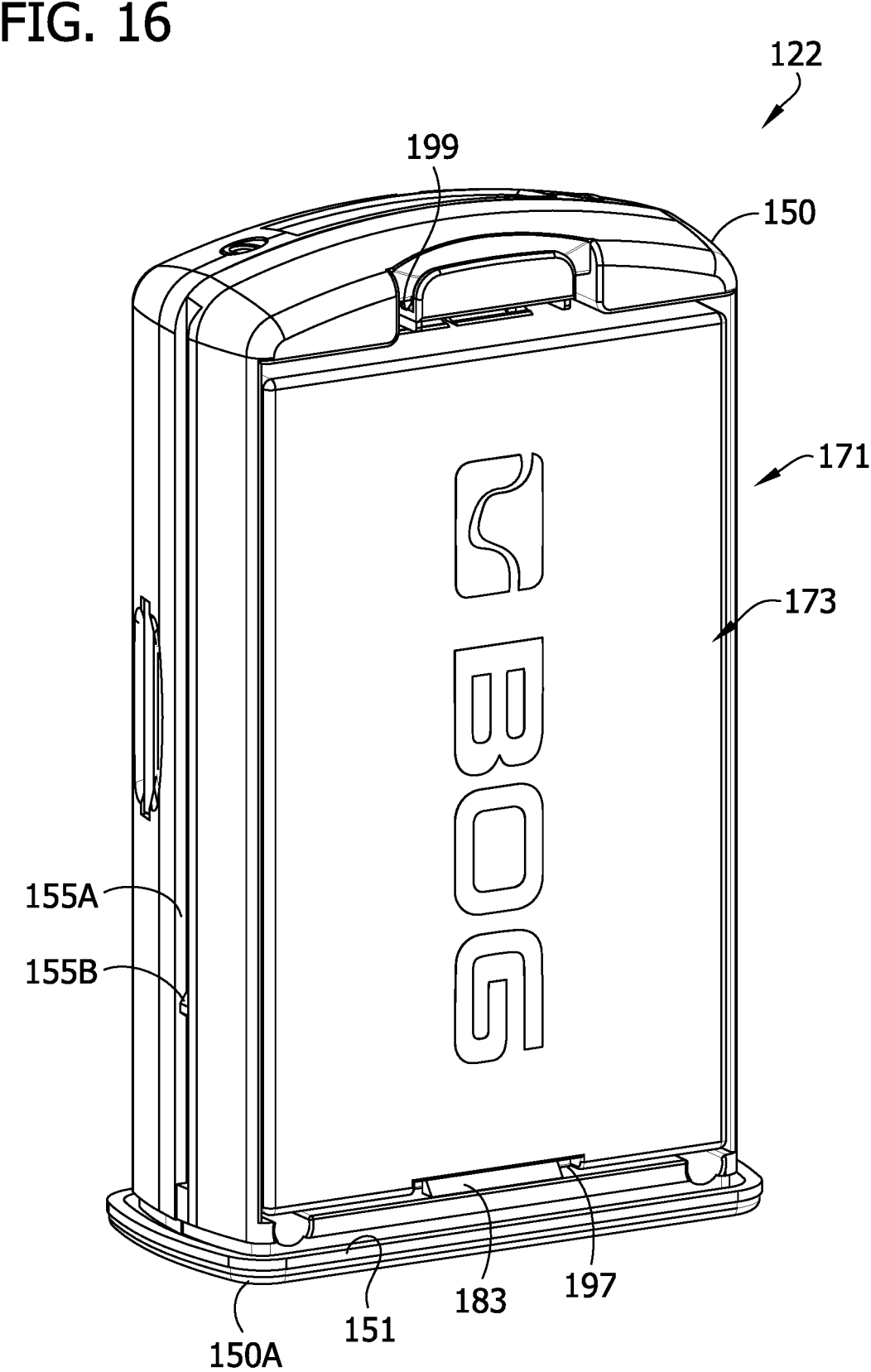
FIG. 16 is a rear perspective of the camera control module.
Figure 17:
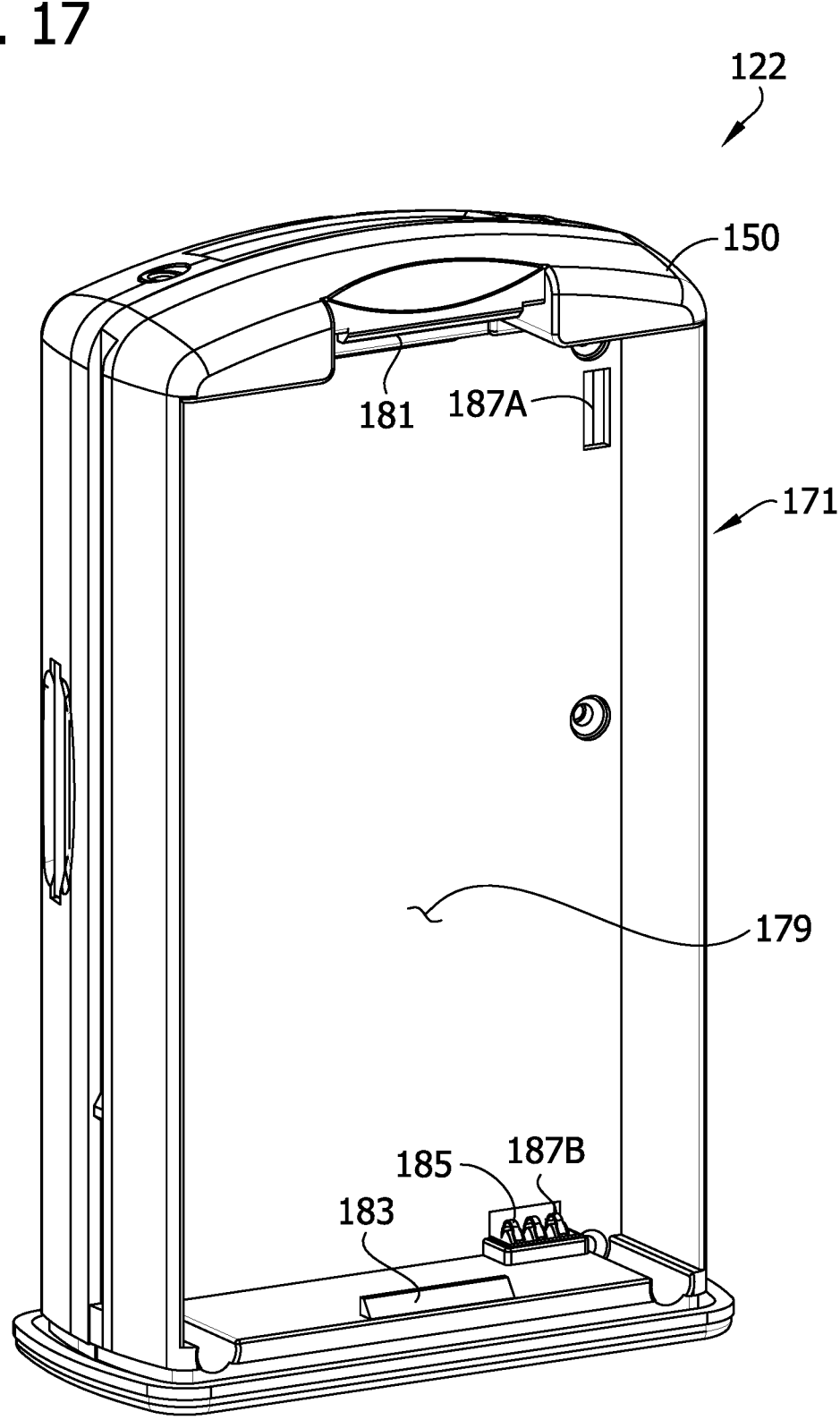
FIG. 17 is a view similar to FIG. 16 but in which a battery holder has been removed to show a power source receiving well of the camera control module.
Figure 18:
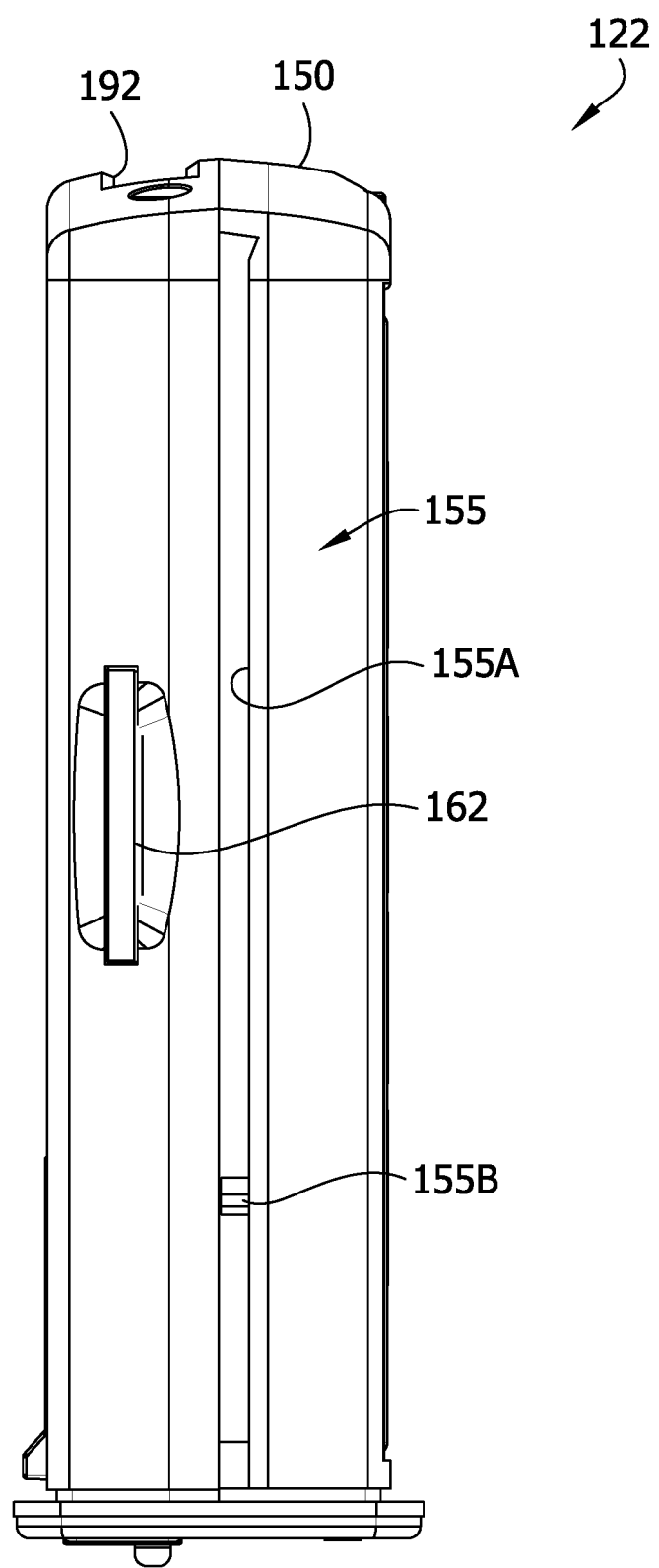
FIG. 18 is a side elevation of the camera control module.
Figure 19:
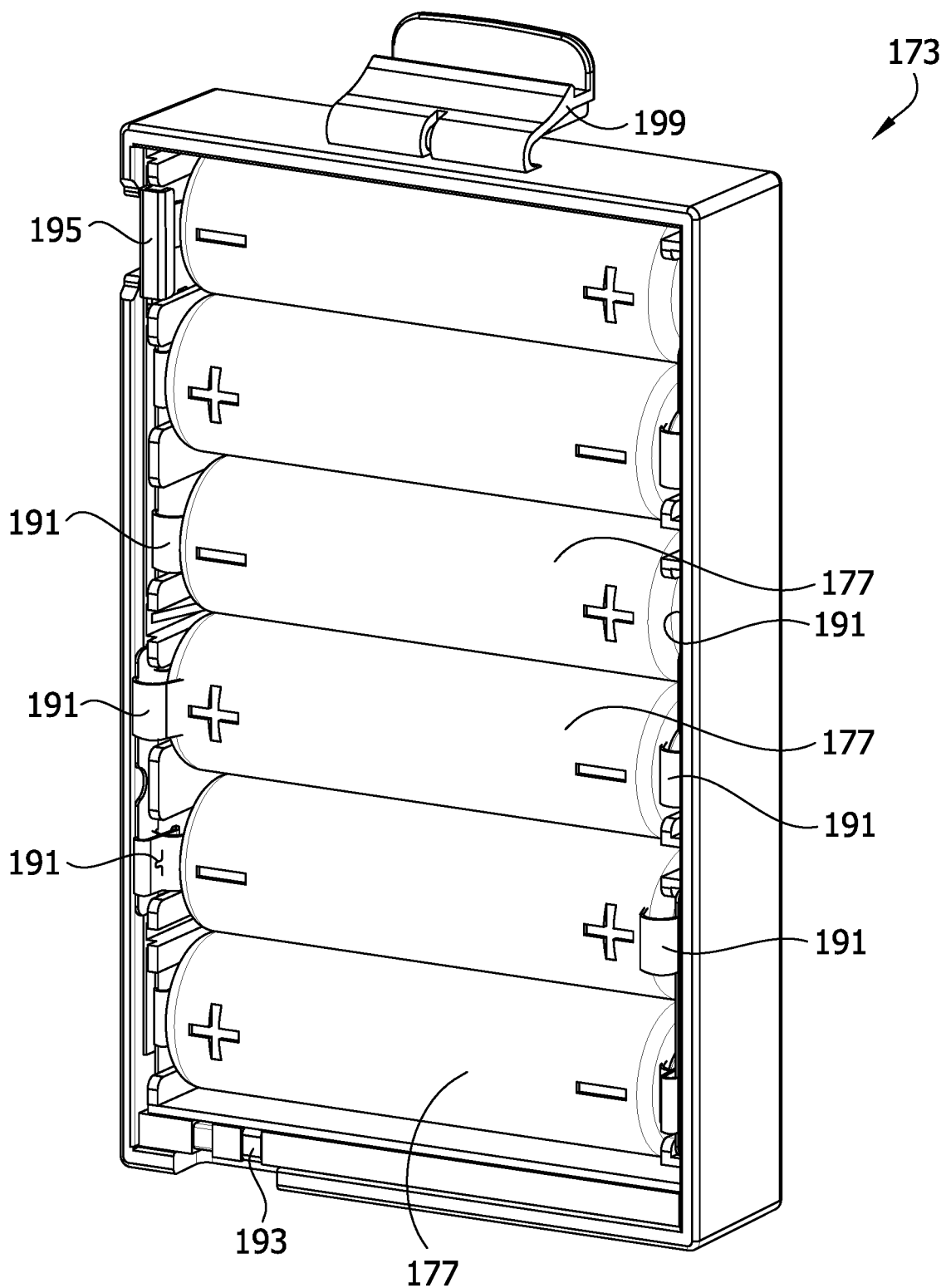
FIG. 19 is a front elevation of a battery holder shown in the power source receiver in FIG. 16 but not in FIG. 17.

As shown in FIGS. 16 and 19, the battery holder 173 comprises a tray having a plurality of walls defining a compartment including a plurality of battery receiving locations bounded on opposite ends by electrical contacts 191 for contacting terminals of the batteries 177. Adjacent pairs of the electrical contacts 191 are connected to each other to connect the batteries in sequence between a positive electrical contact 193 and a negative electrical contact 195 of the battery holder 173. The battery holder 173 includes a keeper 197 corresponding to the lower retainer 183, and a latch 199 corresponding to the upper retainer 181. The latch 199 is supported by a resilient living hinge. The arrangement is such that the lower end of the battery holder 173 can be positioned in the well 179, with the keeper 197 adjacent the lower retainer 183, and then the battery holder can be pivoted about its lower end to bring the upper end of the battery holder into the well 179. The latch 199 engages the upper retainer 181 and deflects temporarily to pass the retainer to move to a retained position with respect to the retainer. As the battery holder 173 is moved into the well 179, the positive and negative electrical contacts 193, 195 of the battery holder move into engagement with the respective positive and negative electrical contacts 185, 187A of the control module 122. For operatively connecting the batteries 177 to the control system 152. To remove the battery holder 173, a user presses on the latch 199 to disengage it from the retainer 181 to permit the holder to be pivoted out of the well 179. The battery holder 173 has a generally rectangular shape and has a height, width, and depth, corresponding closely to a shape, height, width, and depth of the well.

As shown in FIGS. 20 and 21, the rechargeable battery pack 175 includes a housing 201 having a shape and size substantially the same as the battery holder 173 and includes a lower keeper 203 and upper latch 205 similar to the battery holder. The rechargeable battery pack 175 includes positive and negative electrical contacts 207, 209. The positive contact 207 is located in similar location on the housing 201 as on the holder 173 for engaging the respective electrical contacts 187B in the well 179. The negative contract 209 is located near the positive contact 207 and is located to engage the negative contact 187B in the well 179. In the illustrated embodiment, the rechargeable battery pack 175 includes walls enclosing at least one rechargeable battery cell 211 (e.g., a lithium ion cell). A port 213 is provided for operatively connecting a charging power source to the rechargeable cell 211 for charging the cell. For example, the port 213 may comprise a micro-USB port configured to receive a micro-USB connector. The rechargeable battery pack 175 also includes a charge level actuator 215 and associated indicator 217. When the user actuates the charge level actuator 215, or at other times, such as when the port 213 is connected to a charging power source, the indicator 217 shows a charge level of the cell 211. In the illustrated embodiment, the indicator 217 comprises a plurality of LEDs, and the number of LEDs that illuminate compared to the total number of LEDs corresponds to the level of charge of the cell 211. It will be appreciated that the port 213, actuator 215, and indicator 217 are provided on a rear face of the rechargeable pack 175 such that those features are exposed for use when the rechargeable pack is received by the power source receiver 171. Moreover, it will be appreciated that the rechargeable battery pack 175 can be installed and removed from the control module 122 in a similar fashion as the battery holder 173 described above.

In a method of using the camera 110, a user can program the camera using the control module 122 separated or undocked from the camera module 120. The user can view camera settings (e.g., camera mode, camera name, date, time, image capture delay, image capture duration, image capacity, battery level, megapixel setting, etc.) on the display 166 and select, change, and/or save settings to the tangible storage medium 160 using the user input 164. When the user has finished programming the control module 122, the control module is docked on the camera module 120. While the control module 122 is docked on the camera module 120, the image sensors 124, light source 128, motion sensor 130, and microphone 132 are controlled by the controller 154 according to the settings stored in the tangible storage medium 160 (broadly, "camera control instructions"). For example, the image sensors 124 may be controlled to capture images in cooperation with the light source 128 and responsive to signals from the motion sensor 130. Over the course of hours, day, months, etc., images from the image sensors 124 are stored on a storage device (e.g., SD card) connected to the memory device port 162. When the user returns to the camera 110, the control module 122 is undocked from the camera module 120. The user can manipulate the user input 64 to view images on the display 166 from the storage device connected to the port 162. The user can also connect the control module 122 to a computer, tablet, smart phone, or other smart device using the communication port 172 and a suitable cable, or using the antenna 156 (e.g., RF, wireless fidelity, NFC, cellular, etc.), to view and/or download the images to the smart device, download camera data, or view/change/save camera settings, etc. Images on the storage device connected to the port 162 may be tagged or deleted. The storage device may be cleared or exchanged for a new storage device before re-docking the control module 122 on the camera module 120 to capture additional images.

With the control module 122 docked on the camera module 120 or undocked from the camera module, the antenna 156 can be used to wirelessly communicate with other devices. For example, images from the storage device (in port 162) can be transmitted by the antenna 156 to another device (e.g., smart phone) via wireless fidelity communication, near field communication, cellular communication, or another type of communication. Moreover, while the control module 122 is docked or undocked with respect to the camera module 120, the camera settings can be viewed and/or modified by another device (e.g., smart phone), and camera data can be downloaded to the device, via the antenna 156 using wireless fidelity communication, near field communication, cellular communication, and/or another type of communication.

In one aspect of the present disclosure, the camera module 120 and control module 122 are modular in the sense that cameras 110 of the present disclosure can be formed by combining one of a plurality of camera modules with one of a plurality of control modules. The plurality of camera modules may have the same set of components or have different sets of components. For example, a first camera module may include one image sensor (for day and night images), and a second camera module may include two image sensors (one for day images, and the other for night images). Other camera modules can have other differences. Moreover, the control modules can have the same sets of components or different sets of components. A variety of possible control module feature combinations include: without user interface (e.g., including memory device port and optionally communication port, but no user input or display (which may instead be part of the camera module)); with non-color and/or low resolution display (e.g., display used to change camera settings but not to view captured images); with color display (e.g., display used to view, tag, delete photos); with wireless fidelity, radio frequency (e.g., Bluetooth), and/or near field communication (e.g., permitting wireless communication with device such as smart phone for viewing, changing camera settings and/or viewing, editing images); and/or with cellular communication (e.g., LTE for controlling the camera and/or transmitting images using cellular service). A user can select various camera modules and control modules to form a camera to provide a desired combination of features. Modules owned by a user can be interchanged with other modules owned by the user to change feature sets of their cameras. Moreover, if needed, modules can be replaced without replacing an entire camera.

It will be appreciated that other combinations of features could be provided as part of the control module 22, 122 and/or camera module 20, 120. For example, features of the control module and/or camera module described above could be omitted or provided on the other of the control module or the camera module.

Other types of control systems can be used without departing from the present disclosure. For example, more or fewer components than described herein can be used, and some of the components could be provided on the camera module 20, 120 instead of the control module 22, 122, and vice versa.

The electronic components of the camera control module 22, 122, and the electronic components of the camera module 20, 120, can be operatively connected to each other via suitable interconnections electronics, such as printed circuit boards, wiring, etc., by fiber optic lines, or by other connection structure. Moreover, the components of the camera 10, 110 can be operatively connected to each other in other ways, such as wirelessly.

It will be apparent that modifications and variations are possible without departing from the scope of the appended claims.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A camera comprising:
a camera control module including a control module body, the camera control module including a user interface and a camera control system supported by the control module body, the user interface including a user input, the camera control system including a camera controller and a non-transitory tangible storage medium storing camera control instructions executable by the camera controller, the camera controller being responsive to the user input to change the camera control instructions stored on the tangible storage medium;
a camera module including a camera module body, the camera module including an image sensor carried by the camera module body, the camera module including a control module receiver configured to receive the camera control module for mounting the camera control module on the camera module;
wherein the camera control module includes a camera module connector, the camera module includes a control module connector, and the camera module connector and control module connector are configured to connect to each other to communicatively couple the camera controller with the image sensor; and
wherein the camera control instructions are configured to, when executed by the camera controller, when the camera module connector and control module connector are connected to each other, control operation of the image sensor.

2. A camera as set forth in claim 1, wherein the camera control module includes a power source holder configured to releasably hold a power source, the power source holder including an electrical contact for contacting the power source when the power source is held by the power source holder for supplying electrical power to the camera control system, and wherein the camera module connector and control module connector are configured to, when connected to each other, electrically connect the electrical contact with the image sensor to supply electrical power thereto from the power source.

3. A camera as set forth in claim 1, wherein the user interface comprises a display, the camera control module includes a storage device port, and wherein the camera control instructions are executable by the camera controller to cause the display to display images stored on an image storage device connected to the storage device port.

4. A camera as set forth in claim 1, wherein the camera control instructions include camera control settings, the display being configured to display the camera control settings, and the camera controller being responsive to user manipulation of the user input to change the displayed camera control settings.

5. A camera as set forth in claim 1, wherein at least one of the camera control module and the camera module comprises a retainer configured to retain the control module on the control module receiver, the retainer being different from the camera module connector and the control module connector.

6. A camera as set forth in claim 5, wherein the retainer is configured to automatically retain the camera control module on the control module receiver responsive to the camera control module being received by the control module receiver.

7. A camera as set forth in claim 6, wherein the camera module comprises a release configured to be actuated by a user to release the retainer to permit the camera control module to be removed from the control module receiver.

8. A camera as set forth in claim 1, wherein the control module receiver comprises a guide, the camera control module comprises a follower, and the follower is movable along the guide to guide movement of the camera control module with respect to the control module receiver for locating the camera module connector in registration with the control module connector for connecting the camera module connector with the control module connector.

9. A camera as set forth in claim 8, wherein the guide comprises a track, and the follower is configured to mate with the track to guide movement of the camera control module with respect to the control module receiver.

10. A camera as set forth in claim 1, wherein the camera module includes a light source, and wherein the camera control instructions are configured to, when executed by the camera controller, control operation of the light source when the control module connector and camera module connector are connected to each other.

11. A camera as set forth in claim 10, wherein the camera module includes a motion sensor, and wherein the camera control instructions are configured to, when executed by the camera controller, control the image sensor based on a motion signal from the motion sensor when the control module connector and camera module connector are connected to each other.

12. A camera as set forth in claim 1, wherein the camera module includes mounting structure configured to mount the camera module on a support structure different from the camera control module.

13. A camera as set forth in claim 1, wherein at least one of the control module connector or the camera module connector is supported by a resilient bias and is movable against the resilient bias in response to movement of the camera control module with respect to the control module receiver.

14. A camera as set forth in claim 13, wherein the control module connector is supported by the resilient bias and is movable against the resilient bias with respect to the camera module body responsive to movement of the camera control module with respect to the control module receiver.

15. A camera as set forth in claim 1, wherein the camera control module and camera module each comprise mating stabilization structure, the mating stabilization structure being different from the camera module connector and the control module connector, the mating stabilization structure of the camera control module and the mating stabilization structure of the camera module arranged to mate with each other as the camera control module is received by the control module receiver.

16. A camera as set forth in claim 1, wherein the camera control module comprises an antenna configured to transmit at least one of a wireless fidelity communication signal, a near field communication signal, or a cellular communication signal.

17. A camera as set forth in claim 16, wherein the user interface includes a display, and wherein the display is concealed from view from outside the camera module body when the camera control module is received by the control module receiver.

18. A method of using the camera set forth in claim 1, the method comprising:
while the camera control module is separated from and movable with respect to the camera module, manipulating the user input to change the camera control instructions stored by the non-transitory tangible storage medium;

docking the camera control module on the camera module by engaging the camera control module with the control module receiver and connecting the camera module connector and the control module connector; and while the camera control module is docked on the camera module, executing the camera control instructions with the camera controller to operate the image sensor.

19. A method of using the camera set forth in claim 1, the method comprising:

when the camera control module is mounted on the camera module, removing the camera control module from the camera module by disconnecting the camera module connector and the control module connector from one another; and when the camera control module is separate from the camera module, displaying on a display of the user interface an image previously taken by the image sensor.

20. A game camera comprising:

an image sensor;

a motion sensor configured to detect game and generate a motion signal based on the detection of game;

a light source configured to illuminate the game;

a camera control system comprising a user interface including a user input and a display, the camera control system including a camera controller and a non-transitory tangible storage medium storing camera control instructions that, when executed by the camera controller, are configured to control operation of the image sensor, the motion sensor and the light source, wherein the camera control instructions are configured to, when executed by the camera controller, control the image sensor to capture an image of the game based on the motion signal from the motion sensor; and a housing supporting the image sensor, the motion sensor, the light source, the user input, and the display, the housing including mounting structure configured to mount the housing to a tree;

wherein the display is concealed from the user when the display is supported by the housing, the display being selectively disconnectable from the housing to permit the user access to the display.

21. A camera as set forth in claim 20, wherein the mounting structure includes a strap receiver defining a strap receiving opening configured to receive a strap therethrough to mount the housing to the tree.

22. A camera as set forth in claim 20, wherein the user input is concealed from the user when the user input is supported by the housing, and wherein the user input is selectively disconnectable from the housing to permit the user access to the user input.

23. A camera as set forth in claim 22, wherein the display and user input are selectively disconnectable conjointly from the housing.

24. A camera as set forth in claim 20, further comprising a temperature sensor supported by the housing.

25. A camera as set forth in claim 20, wherein the housing lacks an exterior door mounted by a hinge connection and pivotable about the hinge connection between a closed position in which the door covers a portion of the user interface and an open position in which the portion of the user interface is exposed for manipulation by a user.

26. A camera as set forth in claim 20, further comprising a storage device port configured to receive an image storage device to store images from the image sensor, the storage device port being selectively disconnectable from the housing conjointly with the display.

27. A camera as set forth in claim 20, wherein the camera control instructions include camera control settings, the display being configured to display the camera control settings when disconnected from the housing, and the camera controller being responsive to user manipulation of the user input to change the displayed camera control settings.

28. A camera as set forth in claim 27, wherein the camera controller is selectively disconnectable from the housing conjointly with the display.

29. A camera as set forth in claim 20, wherein the housing is coupled to a first communications connector, the display is coupled to a second communications connector, and the first and second communications connectors are configured to connect to each other to form a communications connection when the display is connected to the housing.

30. A camera as set forth in claim 29, further comprising a retainer configured to retain the display connected to the housing, the retainer being different from the first and second communications connectors.

31. A camera as set forth in claim 30, wherein the retainer is configured to automatically retain the display connected to the housing responsive to the display being received by the housing.

32. A camera as set forth in claim 31, wherein the housing comprises a release configured to be actuated by a user to release the retainer to permit the display to be disconnected from the housing.

33. A camera as set forth in claim 29, further comprising a follower coupled to the display and selectively disconnectable from the housing conjointly with the display, and wherein the housing comprises a guide, the follower being movable along the guide to guide movement of the display with respect to the housing for locating the first and second communications connectors in registration with each other for connecting the first and second communications connectors.

34. A camera as set forth in claim 33, wherein the guide comprises a track, and the follower is configured to mate with the track to guide movement of the display with respect to the housing.

35. A camera as set forth in claim 29, wherein at least one of the first communications connector or the second communications connector is supported by a resilient bias and is movable against the resilient bias in response to movement of the display with respect to the housing.

36. A camera as set forth in claim 20, wherein the mounting structure includes a threaded opening for mounting the housing to the tree.

37. A camera as set forth in claim 20, wherein the display is operable when disconnected from the housing to display images from the image sensor.

38. A camera as set forth in claim 37, further comprising a storage device port configured to receive an image storage device to store images from the image sensor, the display being operably connected to the storage device port when the display is disconnected from the housing to display images from the image storage device in the storage device port.

39. A camera as set forth in claim 38, further comprising a storage device port configured to receive an image storage device to store images from the image sensor, the storage device port being selectively disconnectable from the housing conjointly with the display.

40. A camera comprising:

an image sensor;

a light source;

a camera control module comprising a user interface including a user input and a display, the camera control module including a camera controller and a non-transitory tangible storage medium storing camera control instructions configured to, when executed by the camera controller, control operation of the image sensor and light source, the camera control module including a control module body, the user interface being supported by the control module body, the control module body including a power source receiver configured to receive a power source for providing electrical power to the image sensor, light source, and camera control module, the power source receiver defining a power source receiving space sized and shaped to receive the power source;

a camera body supporting the image sensor, light source, and camera control module;

a battery holder configured to releasably hold at least one disposable battery, the battery holder sized and shaped to be received in the power source receiving space of the power source receiver for providing electrical power to the image sensor, light source, and camera control module from the at least one disposable battery;

a rechargeable battery pack comprising a housing enclosing a rechargeable battery, the rechargeable battery pack being sized and shaped to be received in the power source receiving space of the power source receiver for providing electrical power to the image sensor, light source, and camera control module from the rechargeable battery; and wherein the battery holder and rechargeable battery pack are configured to be interchangeably received in the power source receiving space of the power source receiver for providing electrical power to the image sensor, light source, and camera control module using the battery holder or the rechargeable battery pack.

* * * * *